(12) United States Patent
Hemphill et al.

(10) Patent No.: US 7,997,159 B2
(45) Date of Patent: Aug. 16, 2011

(54) GEAR SELECTION ASSEMBLY WITH NESTED DIFFERENTIALLY ROTATABLE TUBE

(75) Inventors: Jeffrey Hemphill, Copley, OH (US); Mavinkal Jayaram, Broadview Heights, OH (US); Brian Lee, York, SC (US); Robert Southam, Tega Cay, SC (US)

(73) Assignee: Schaeffler KG, Herzogenaurach (DE)

( * ) Notice: Subject to any disclaimer, the term of this patent is extended or adjusted under 35 U.S.C. 154(b) by 812 days.

(21) Appl. No.: 11/924,081

(22) Filed: Oct. 25, 2007

(65) Prior Publication Data
US 2008/0098843 A1    May 1, 2008

Related U.S. Application Data

(60) Provisional application No. 60/854,528, filed on Oct. 26, 2006, provisional application No. 60/876,661, filed on Dec. 22, 2006.

(51) Int. Cl.
*F16H 59/00* (2006.01)
*F16H 61/00* (2006.01)
*F16H 63/00* (2006.01)
*F16H 3/38* (2006.01)
*F16H 3/08* (2006.01)
*F16H 3/44* (2006.01)

(52) U.S. Cl. ............. 74/339; 74/371; 74/372; 74/337.5; 475/298

(58) Field of Classification Search ............ 74/339–375; 475/298–300
See application file for complete search history.

(56) References Cited

U.S. PATENT DOCUMENTS

| | | | | |
|---|---|---|---|---|
| 1,941,963 | A * | 1/1934 | Wise | 74/372 |
| 3,707,884 | A * | 1/1973 | Go | 74/372 |
| 5,131,285 | A * | 7/1992 | Weismann et al. | 74/333 |
| 5,214,974 | A * | 6/1993 | Morbidelli | 74/371 |
| 5,404,768 | A * | 4/1995 | Hwang et al. | 74/371 |
| 5,570,608 | A * | 11/1996 | Miller | 74/325 |
| 5,611,556 | A * | 3/1997 | Davidow | 280/236 |
| 5,689,998 | A * | 11/1997 | Lee | 74/371 |
| 5,950,490 | A * | 9/1999 | Di Stefano | 74/333 |
| 5,992,254 | A * | 11/1999 | Machado | 74/335 |
| 6,065,361 | A * | 5/2000 | Martin et al. | 74/371 |
| 6,450,054 | B1 * | 9/2002 | Li | 74/371 |
| 6,675,667 | B1 * | 1/2004 | Pelletier et al. | 74/333 |
| 6,698,303 | B2 * | 3/2004 | Hoffmann et al. | 74/337.5 |
| 6,898,993 | B2 * | 5/2005 | Matsumoto et al. | 74/371 |
| 7,055,403 | B2 * | 6/2006 | Liu | 74/372 |

* cited by examiner

*Primary Examiner* — Tisha D Lewis
(74) *Attorney, Agent, or Firm* — Lucas & Mercanti, LLP

(57) ABSTRACT

The present invention broadly comprises a gear selector assembly including a tube with at least one engagement feature, arranged to be disposed within a drive shaft for a transmission, the transmission including at least one gear and the drive shaft including at least one gear actuation assembly; and a differential rotation element coupled with the tube and arranged to be coupled with the drive shaft so that the tube is differentially rotatable with respect to the drive shaft. The tube is arranged to differentially rotate such that the engagement feature engages the actuation assembly and the transmission engages a respective gear from the at least one gear. The assembly includes a means for displacing a portion of the differential rotation element such that the tube axially and rotationally displaces with respect to the drive shaft. The portion axially and rotationally engages with an interface element to controllably position the tube.

26 Claims, 31 Drawing Sheets

GEAR SELECTION ASSEMBLY WITH NESTED DIFFERENTIALLY ROTATABLE TUBE

FIELD OF THE INVENTION

The invention relates to an apparatus for selecting and engaging a gear in a motor vehicle transmission. In particular, the invention relates to a nested, differentially rotatable tube in a drive shaft used to control the operation of gear selection and engagement assemblies in the transmission.

BACKGROUND OF THE INVENTION

It is known to use synchronizers, typically consisting of a cone clutch and a dog clutch, to select and engage gears in a transmission. A separate synchronizer must be used for each gear. Unfortunately, each synchronizer takes up considerable axial space in the transmission. This axial space undesirably increases the length of an output shaft to which the gears are mounted, which subsequently increases the length of the transmission. Also, the synchronizers move axially during operations, further increasing the length requirement of the shaft. The increase in shaft length can be addressed by the use of two shorter shafts; however, the two shafts increase the weight and cost of the transmission.

Thus, there is a long-felt need for a means to select and engage gears that would use less axial space in a transmission.

BRIEF SUMMARY OF THE INVENTION

The present invention broadly comprises a gear selector assembly including: a first tube with at least one first engagement feature, the first tube arranged to be disposed within a drive shaft for a transmission, the transmission including at least one gear and the drive shaft including at least one gear actuation assembly; and a differential rotation element coupled with the first tube and arranged to be coupled with the drive shaft so that the first tube is differentially rotatable with respect to the drive shaft. The first tube is arranged to differentially rotate such that the at least one first engagement feature engages the at least one gear actuation assembly and the transmission engages a respective gear from the at least one gear. The gear selector assembly includes a means for displacing a portion of the differential rotation element such that the first tube axially and rotationally displaces with respect to the drive shaft. The gear selector assembly includes an interface element arranged to be disposed within the drive shaft and rotationally fixed to the drive shaft. The portion of the differential rotation element axially and rotationally engages with the interface element to controllably position the first tube.

In some aspects, controllably positioning the first tube includes rotating or axially displacing the first tube. In some aspects, the differential rotation element includes a gear set. In some aspects, the gear set includes a planetary gear set, the planetary gear set includes a first ring carrier fixedly secured to the first tube and a second ring carrier arranged to be fixedly secured to the drive shaft and the portion of the differential rotation element includes the first ring carrier. In some aspects, the first ring carrier includes at least one protrusion, the interface element includes at least one slot, and the at least one protrusion is axially and rotationally displaceable through the at least one slot. In some aspects, the means for displacing a portion of the differential rotation element includes a shaft connected to the portion of the differential rotation element and arranged to transfer rotational motion to the portion of the differential rotation element.

In some aspects, the means for displacing a portion of the differential rotation element includes an actuator, the shaft is connected to the actuator, and the actuator is arranged to rotate the shaft. In some aspects, the actuator is selected from the group consisting of an electric motor and a hydraulic actuator. In some aspects, the at least one first engagement feature includes a plurality of first engagement features, the at least one respective gear actuation assembly includes a plurality of gear actuation assemblies, and the plurality of first engagement features is disposed such that no more than one gear actuation assembly from the plurality of gear actuation assemblies engages the plurality of first engagement features at any one time.

In some aspects, the at least one first engagement feature includes an indent in an outer surface of the first tube, the at least one respective gear actuation assembly includes a pin urged against the first tube, and the first tube is alignable to engage the pin with the indent so that the transmission engages a respective gear from the at least one gear; or the at least one first engagement feature includes an indent in an outer surface of the first tube, the at least one respective gear actuation assembly includes a pin engaged with the indent, and the first tube is displaceable to disengage the pin and the indent such that the transmission disengages a respective gear from the at least one gear.

In some aspects, the first tube is controllably connected to the differential rotation element, the at least one gear includes first and second groups of gears, and the first tube is associated with the first group, and the assembly includes a second tube with at least one second engagement feature, the second tube arranged to be disposed within the drive shaft, the second tube controllably coupled with the differential rotation element and arranged to be coupled with the drive shaft so that the second tube is differentially rotatable with respect to the drive shaft. The second tube is arranged to differentially rotate such that the at least one second engagement feature engages the at least one gear actuation assembly and the transmission engages a respective gear from the second group of gears. In some aspects, the means for displacing a portion of the differential rotation element axially and rotationally displaces the second tube with respect to the drive shaft and the portion of the differential rotation element axially and rotationally engages with the interface element to controllably position the second tube.

The present invention also broadly comprises a gear selector assembly including: a first tube with at least one first engagement feature, the first tube arranged to be disposed within a drive shaft for a transmission, the transmission including first and second groups of gears and the drive shaft including a plurality of gear actuation assemblies; a second tube with at least one second engagement feature, the second tube arranged to be disposed within the drive shaft; and a differential rotation element controllably coupled with the first and second tubes and arranged to be coupled with the drive shaft so that the first and second tubes are differentially rotatable with respect to the drive shaft. The first and second tubes are arranged to differentially rotate such that the at least one first and second engagement features engage the at least one gear actuation assembly and the transmission engages respective gears from the first and second groups of gears. The gear selector assembly includes a means for displacing a portion of the differential rotation element such that the first and second tubes axially and rotationally displace with respect to the drive shaft. The gear selector assembly includes an interface element arranged to be disposed within the drive shaft and rotationally fixed to the drive shaft. The portion of the differential rotation element axially and rotationally engages with the interface element to controllably position the first and second tubes.

In some aspects, the gear set includes a planetary gear set with a first ring carrier controllably connectable to the first and second tubes and a second ring carrier arranged to be fixedly secured to the drive shaft and the portion of the differential rotation element includes the first ring carrier. In some aspects, the first ring carrier includes at least one protrusion, the interface element includes at least one slot, and the at least one protrusion is axially and rotationally displaceable through the at least one slot. In some aspects, the means for displacing a portion of the differential rotation element includes a shaft connected to an actuator and the portion of the differential rotation element, the shaft arranged to transfer rotational motion from the actuator to the portion of the differential rotation element to displace the portion of the differential rotation element.

In some aspects, the at least one first and second engagement features comprise a plurality of first and second engagement features, respectively, the at least one respective gear actuation assembly includes a plurality of gear actuation assemblies for the first group and a plurality of gear actuation assemblies for the second group, and the pluralities of first and second engagement features are disposed such that no more than one gear actuation assembly each from the pluralities of gear actuation assemblies for the first and second groups engages the pluralities of first and second engagement features, respectively, at any one time.

In some aspects, the at least one first and second engagement features include a plurality of first and second engagement features, respectively, the at least one respective gear actuation assembly includes respective pluralities of gear actuation assemblies for the first and second groups, and the pluralities of first and second engagement features are disposed such that no more than one gear actuation assembly each from the respective pluralities of gear actuation assemblies for the first and second groups are engageable the pluralities of first and second engagement features, respectively, at any one time.

In some aspects, the at least one first and second engagement features include a plurality of first and second engagement features, respectively, the at least one respective gear actuation assembly includes respective pluralities of gear actuation assemblies for the first and second groups, and the pluralities of first and second engagement features are disposed such that one gear actuation assembly each from the respective pluralities of gear actuation assemblies for the first and second groups are simultaneously engageable the pluralities of first and second engagement features, respectively.

The present invention also broadly comprises a gear selector assembly including: a tube with at least one engagement feature, the tube arranged to be disposed within a drive shaft for a transmission, the transmission including at least one gear and the drive shaft including at least one gear actuation assembly; a planetary gear set with a first ring carrier fixedly secured to the tube and a second ring carrier arranged to be fixedly secured to the drive shaft so that the tube is differentially rotatable with respect to the drive shaft, the first ring carrier including a protrusion; a means for axially and rotationally displacing the first ring carrier; and an interface element arranged to be disposed within the drive shaft and rotationally fixed to the drive shaft, the interface element including at least one slot. The first ring carrier axially and rotationally displaces through the at least one slot to controllably position the tube such that the at least one first engagement feature engages the at least one gear actuation assembly and the transmission engages a respective gear from the at least one gear.

The present invention broadly comprises a gear selector assembly including: a tube with at least one engagement feature, the tube arranged to be disposed within a drive shaft for a transmission, the transmission including a plurality of gears; at least one gear actuation assembly arranged to be disposed on the drive shaft; and a differential rotation element coupled with the tube and arranged to be coupled with the drive shaft so that the tube is differentially rotatable with respect to the drive shaft. The differential rotatability is arranged to cause the at least one engagement feature to engage the at least one gear actuation assembly such that the transmission engages a respective gear from the plurality of gears. The gear selector assembly includes a means for displacing a portion of the differential rotation element such that the tube axially and rotationally displaces with respect to the drive shaft. The gear selector assembly includes an interface element arranged to be disposed within the drive shaft and rotationally fixed to the drive shaft. The portion of the differential rotation element axially and rotationally engages with the interface element to controllably position the first tube.

It is a general object of the present invention to reduce the axial length of an assembly to control the selection and engagement of gears in a transmission.

It is another object of the present invention to provide an assembly, coaxial with a drive shaft for a transmission, to control the selection and engagement of gears for the transmission.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
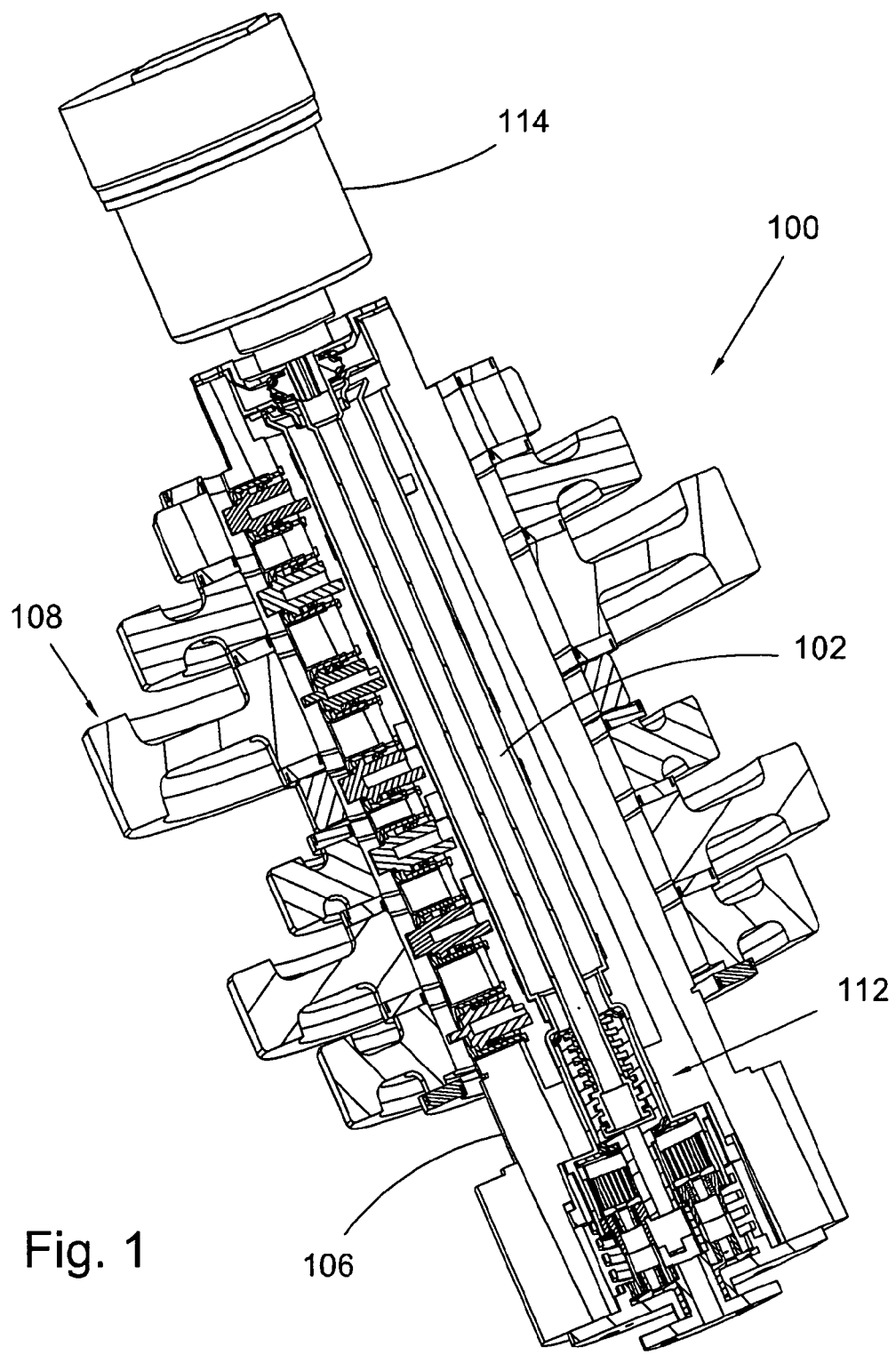
FIG. 1 is a cross-sectional view of a present invention gear selection assembly with axial activation.

FIG. 1 is a cross-sectional view of present invention gear selection assembly 100 with axial activation.

Figure 2:
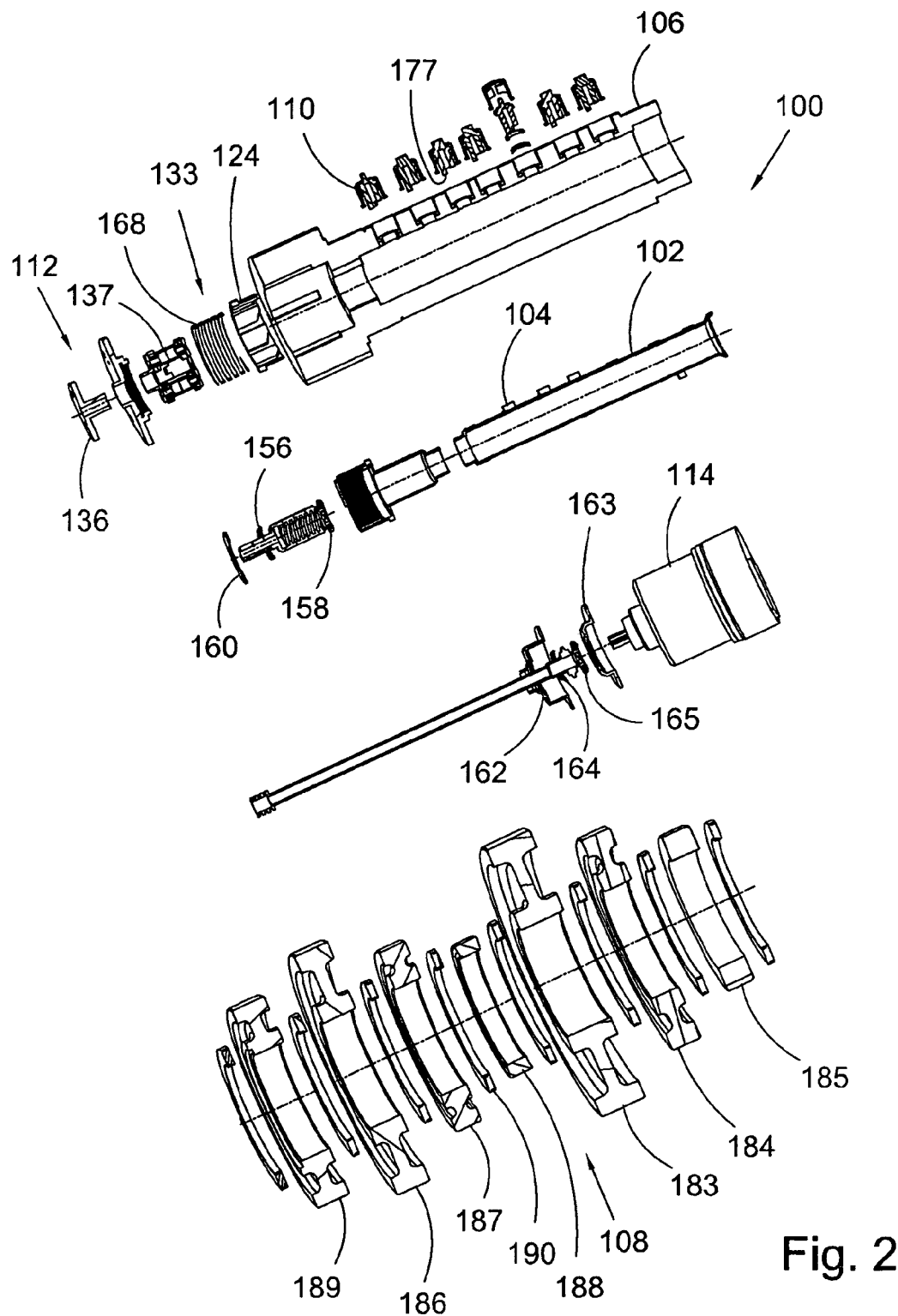
FIG. 2 is an exploded view of the assembly and drive shaft in FIG. 1.

FIG. 2 is an exploded view of assembly 100 and drive shaft in FIG. 1.

Figure 3:
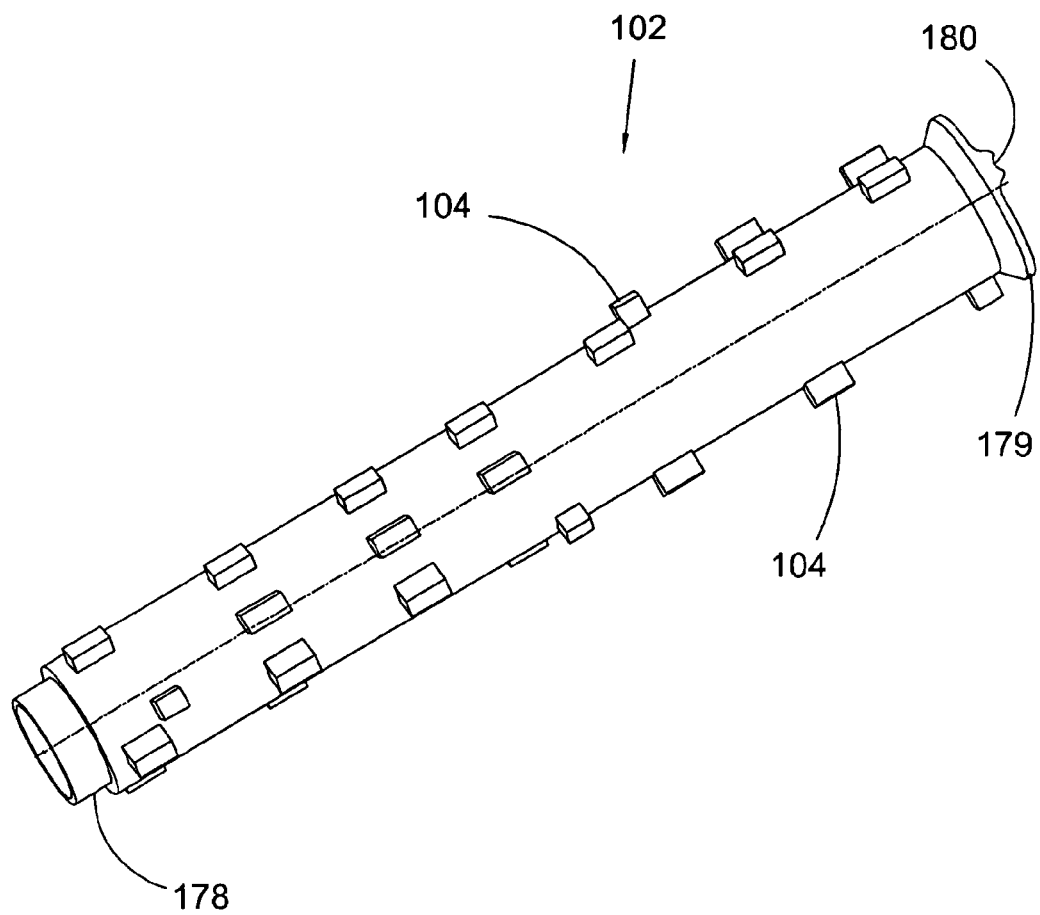
FIG. 3 is a perspective view of the tube in FIG. 1.

FIG. 3 is a perspective view of the tube in FIG. 1.

Figure 4:
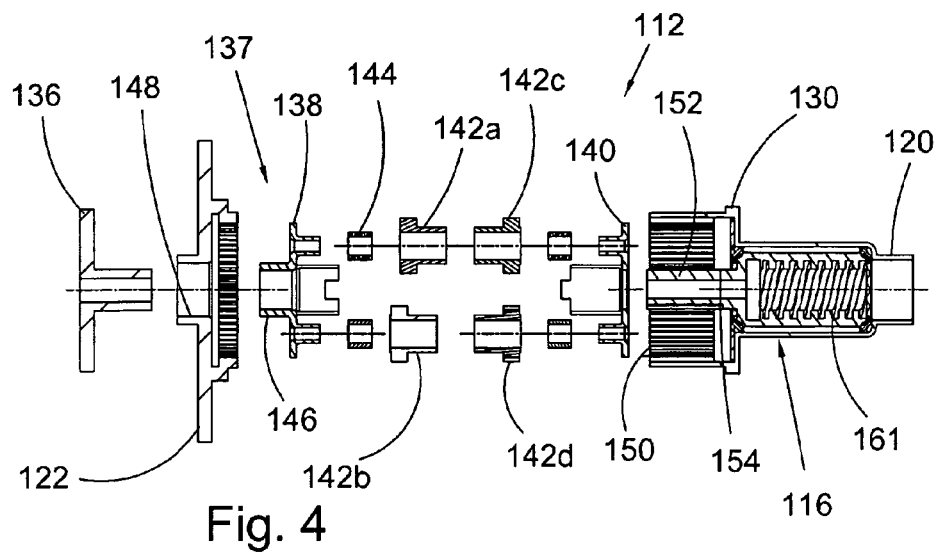
FIG. 4 is an exploded view of the differential rotation element in FIG. 1.

FIG. 4 is an exploded view of differential rotation element 112 in FIG. 1. The following should be viewed in light of FIGS. 1 through 4. Assembly 100 includes tube 102 with at least one engagement feature 104. In some aspects, feature 104 is a protrusion. Tube 102 is arranged to be disposed in drive shaft 106 for a transmission (partially shown). The transmission includes at least one gear 108 and drive shaft 106 includes at least one gear actuation assembly 110. In the description that follows, at least one gear 108 is a plurality of gears, however, it should be understood that at least one gear 108 can be a single gear.

Assembly 100 includes differential rotation element 112 coupled with tube 102 and arranged to be coupled with the drive shaft so that tube 102 is differentially rotatable with respect to the drive shaft. Tube 102 is arranged to differentially rotate such that engagement features 104 engage gear actuation assemblies 110 and the transmission engages a respective gear from gears 108. Assembly 100 also includes means 114 for displacing portion 116 of differential rotation element 112 such that tube 102 axially and rotationally displaces with respect to the drive shaft. Means 114 includes shaft 118 connected to portion 116 and arranged to transfer rotational motion to portion 116. In some aspects, means 114 is an actuator, shaft 118 is connected to the actuator, and the actuator is arranged to rotate the shaft. It should be understood that any actuator known in the art, such as a hydraulic actuator, can be used for actuator 114. In FIGS. 1 through 3, the actuator is an electric motor.

In some aspects, element 112 is a gear set. In some aspects, the gear set is a planetary gear set, for example, as shown in FIG. 4. Then, ring gear 116 is the portion of element 112 displaced by means 114. Gear 116 is fixedly secured to tube 102 at end 120 and ring gear 122 is arranged to be fixedly secured to the drive shaft.

Figure 5:
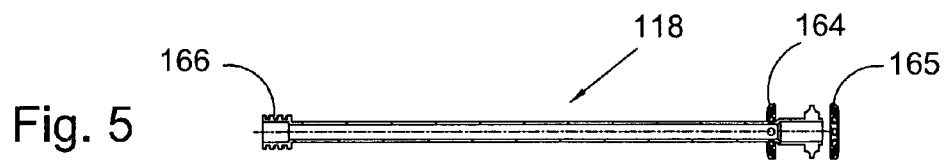
FIG. 5 is a cross-sectional view of the shaft for the displacing means in FIG. 1.

FIG. 5 is a cross-sectional view of shaft 118 in FIG. 1.

Figure 6:
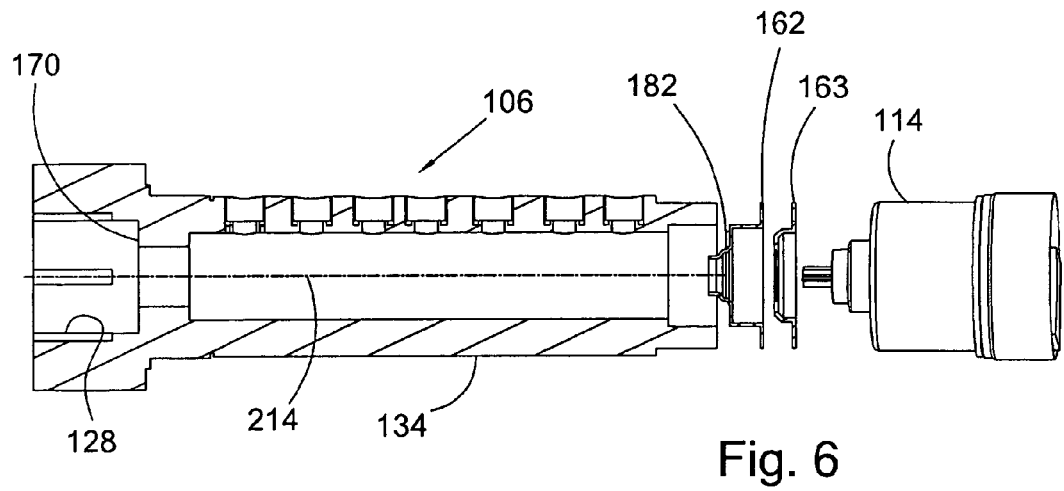
FIG. 6 is a cross-section view of the drive shaft in FIG. 1.

FIG. 6 is a cross-section view of drive shaft 106 in FIG. 1.

Figure 7:
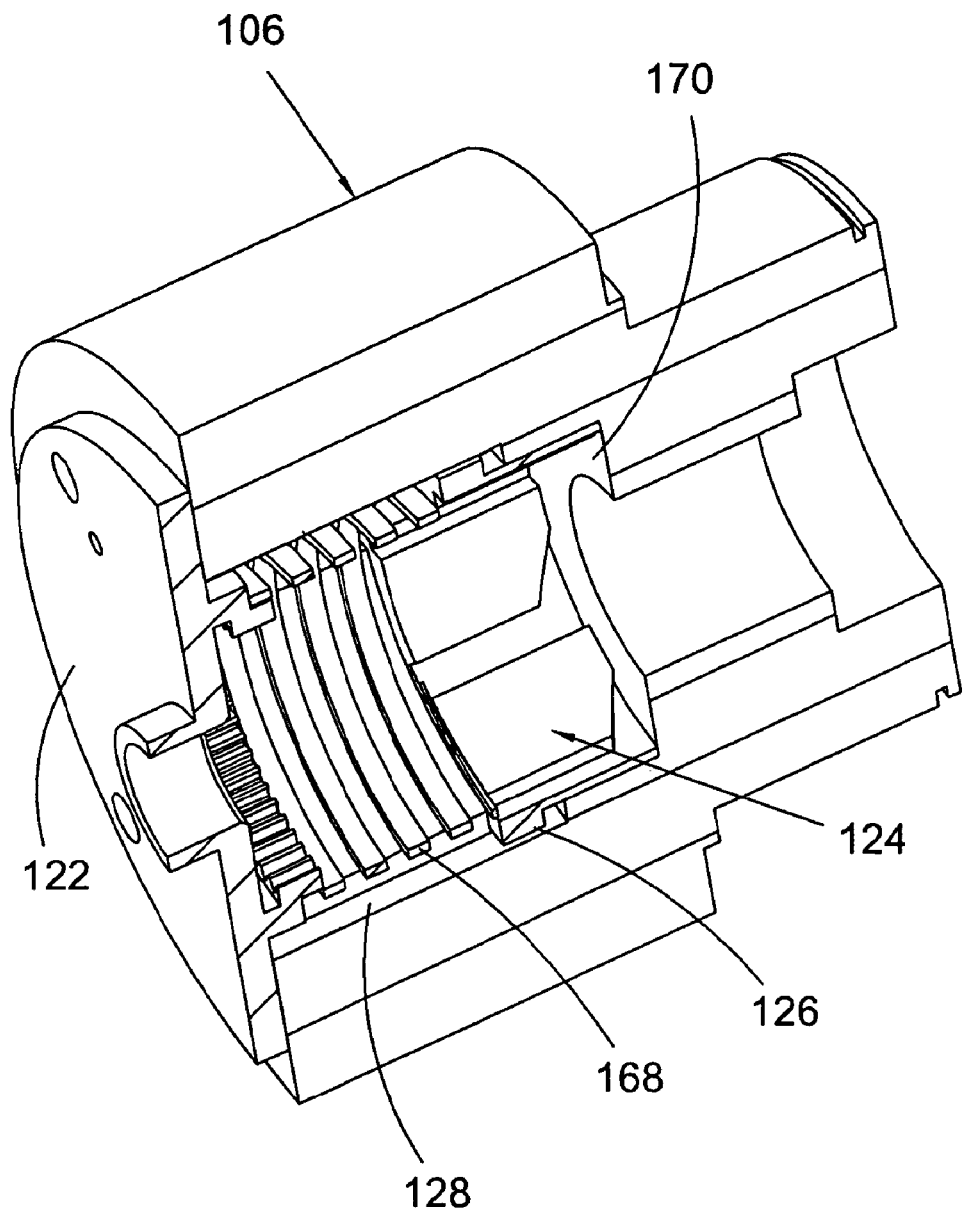
FIG. 7 is a detail of FIG. 1 showing the interface element and drive shaft.

FIG. 7 is a detail of FIG. 1 showing the interface element and the drive shaft.

Figure 8:
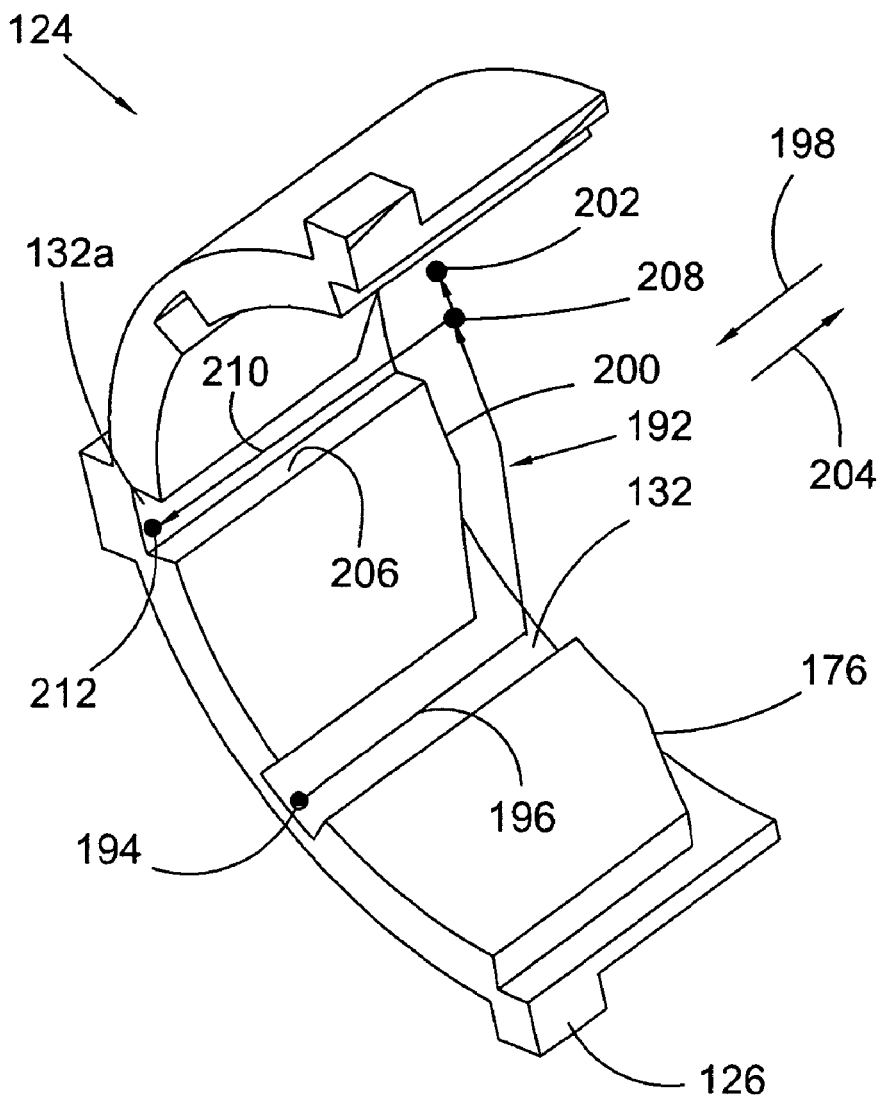
FIG. 8 is a perspective cross-sectional view of the interface element in FIG. 1.

FIG. 8 is a perspective cross-sectional view of the interface element. The following should be viewed in light of FIGS. 1 through 8. Assembly 100 includes interface element 124 arranged to be disposed within the drive shaft and rotationally fixed to the drive shaft. By rotationally connected, or fixed, we mean that the element and the shaft are connected such that the two components rotate together, that is, the two components are fixed with respect to rotation. Rotationally connecting two components does not necessarily limit relative movement in other directions. For example, it is possible for two components that are rotationally connected to have axial movement with respect to each other via a spline connection. However, it should be understood that rotational connection does not imply that movement in other directions is necessarily present. For example, two components that are rotationally connected can be axially fixed one to the other. The preceding explanation of rotational connection is applicable to the discussions infra. Element 124 is axially displaceable with respect to the drive shaft due to the interface of lugs 126 on the element and matching grooves 128 in the drive shaft. Carrier 116 axially and rotationally engages with the interface element to controllably position tube 102, as further described infra. In some aspects, controllably positioning the tube includes rotating the tube. In some aspects, controllably positioning the tube includes axially displacing the tube.

Gear 116 includes at least one protrusion, or lug, 130 and interface element 124 includes at least one slot 132. The protrusion is axially and rotationally displaceable through slots 132 as described infra.

The following is a more detailed description of the components of assembly 100. Assembly 100 includes planetary gear assembly 112; interface assembly, or one way clutch assembly, 133, which includes interface element 124; and tube 102, arranged to engage or connect to gear actuation assembly 110. When used with a single electric servo motor 114, these components can be used to engage up to two gears (one even and one odd) from the gear set 108. In some aspects, the actual engagement element is a slipper clutch (not shown) located in the cylindrical space between the outer diameter 134 of the drive shaft and the inner diameter of individual gears 108. Servo motor 114 is fixed to the gear box housing (not shown).

Planetary gear assembly 112 includes sun gear 136 fixed to the gear box housing (not shown). Planet carrier assembly 137 includes carriers 138 and 140 that carry four (4) rotatable planet gears 142a, 142b, 142c, 142d, each with a pressed in bronze bushings 144. The planet carrier assembly is positioned axially such that planet gears 142a and 142b mate with the ring gear 122. Pilot 146 mates with internal pilot 148 for accurate radial position of the gear carrier 138.

Planet gears 142c and 142d mate with ring gear 116. Gear teeth 150 are cut longer than the widths of the planet gears to facilitate axial motion of gear 116 while still maintaining gear contact with gears 142c and 142d. Sun gear shaft 152 mates with planet gears 142c and 142d. Sun shaft 152 is rotatable, axially fixed, and radially centered in inside bore 154 of gear 116 using any means known in the art, for example, ball bearings 156 and 158. Plate 160 is fixed to gear 116 and axially fixes sun gear shaft 152 with gear 116. Any axial motion exhibited by the sun gear shaft is transmitted to ring gear 116 via ball bearings 156 and 158. Sun gear shaft 152 has an internal thread 161. The thread can be right-handed or left-handed. The gear on shaft 152 is similar to gear on sun gear 136 but longer in length. It should be understood that a present invention planetary gear assembly is not limited to the size, number, and configuration of components described supra.

Input shaft 118 is rotationally connected to servo motor 114 using any means known in the art. In some aspects, a bearing pack including element 162-165 supports shaft 118 drive shaft and axially fixes shaft 118. Shaft 118 also has internal splines matching splines on the motor. Thread 166 on shaft 118, mates with the internal thread 161. Members 162 and 163 are fixed rigidly to the drive shaft.

Interface assembly 133 includes interface element 124 and compression element 168. Element 168 can be any compression element known in the art, for example, a spring. Element 124 is urged axially by element 168 and is fixed rotationally and axially displaceable by clutch element lugs 126 and grooves 128. Spring 168 reacts against gear 122 to keep clutch member 124 firmly pressed against surface 170 of the drive shaft.

At least one lug 130 on the periphery of gear 116 rides inside a respective matching groove, or slot, 132 in one way clutch element 124, facilitating axial motion of member 116. Each of grooves 132 ends in a respective ramp 176. The ramps enable a smooth transition of gear 116 from axial to rotational motion in one direction. The ramps are used for transitioning from gear shift to gear select and from gear select to gear shift as described infra.

Individual engagement features, or protrusions, 104 on the surface of tube 102 function to either engage a particular gear 108 by rotating an actuation pin 177 in a particular direction or disengage a gear 108 by rotating the corresponding actuation pin in the opposite direction, as further described below. Protrusions 104 are arranged such that before selecting a particular gear, all other gears of the same type (even or odd) are first disengaged and interlocked. This arrangement provides a positive step to prevent engaging two gear of the same type simultaneously. Tube 102 is rigidly attached to end 120 of ring gear 116 by mating end 178. Thus, any movement in gear 116 is transmitted to the tube. End 179 of the tube has notched lug 180 that engages protrusion 182 on end plate 162. This engagement process (described infra) generates a detent in the rotary motion of the tube facilitating the recognition of the rotary position of the tube by electronic motor controller 114. The protrusion on plate 162 is oriented such that the detent occurs at a known angle before or after the neutral gear position.

In general, gear set 108 includes two groups of gears, for example, gears 183-185 are the odd gears and are placed on the drive shaft consecutively and members 186-188 are even gears, also placed consecutively with reverse gear 189. It should be understood that other numbers and combinations of gears can be used with assembly 100. Individual gears are separated as is known in the art, for example, by thrust bearings 190, to react axial thrust loads generated by gear set 108.

The following describes the operation of assembly 100 in further detail. Functionally, assembly 100 can be divided into two operations—gear select and gear shift. The two operations are achieved by appropriate manipulation of the assembly as described infra.

Gear assembly 112 operation: this assembly allows servo motor 114 to rotate tube 102 with respect to the drive shaft even if the drive shaft is rotating. The differential gear assembly also allows motor 114 to be rotated only when the tube needs to be rotated, even when the drive shaft is rotating. Gear 122 is fixedly secured, or rigidly fixed, to the drive shaft. Sun gear 136 is non-rotating. Planet carrier assembly 137 rotates in the same direction as the drive shaft. Planet gears 142c and 142d mate with gears 150 on one side and gear shaft 152 on the other side. Any rotation of gear shaft 152 results in an increase or decrease of the rotational speed of gears 142c and 142d in planet carrier assembly 137. The rotational speed of the planet carrier assembly is determined by the rotational speed of shaft 106. Thus an increase in the speed of gears 142c and 142d is transferred to gear 116. Gear 116 is rigidly connected to the tube and thus relative motion occurs between the drive shaft and the tube.

To initiate a gear select operation, the servo motor turns turning input shaft 118. Threads 166 mate with threads 161, moving gear shaft 152 axially towards the servo motor. Shaft 152 is prevented from turning relative to the drive shaft by lug 130 riding in one of slots 132 of one way clutch element 124. Element 124 is configured such that when ring gear 116 touches surface 170, lug 130 begins to engage a respective ramp 176. The configuration of the ramps enables lug 130, and ring gear 116 to rotate in the direction of the ramps. The lug slides along the ramps and lifts one way clutch 124 away from surface 170. The axial displacement of element 124 enables the desired rotation of lug 130 along the ramps and subsequent rotation of gear 116 and tube 102. The axial displacement also is used to properly align the lug in the slot for the selected gear as further described supra.

The following describes a sequence of positioning and movement of lug 130 with respect to element 124. Path 192 shows the approximate movement of lug 130 from an engaged position for assembly 100 though the gear selection process to the engagement of another gear in group 108. By engaged position we mean that one gears in group 108 is engaged in the transmission (the clutch for that gear is transmitting torque) and ring gear 116 maintains a static position with respect to element 124. In the engaged position, lug 130 is approximately located at point 194 at one end of a slot. It should be understood that in the engaged position, lug 130 is in a slot, but the exact location of point 194 can vary from that shown in FIG. 6.

To begin the select process, motor 114 rotates shaft 118 clockwise, as described supra, causing lug 130 to translate axially through segment 196 until the lug reaches the ramp. During this translation, tube 102 also translate axially, but does not rotate. When the lug reaches the ramp, the force transmitted by shaft 118 causes the lug to rotate clockwise and ride up the ramp, which causes element 124 to axially slide in direction 198. The motor continues to rotate shaft 118 clockwise along surface 200 until the lug reaches point 202, which is known to be further clockwise than the desired position for lug 130 with respect to slot 132a (associated with the selected gear). As the lug clears surface 200, spring 168 pushes element 124 back in direction 204 until the element again rests against surface 170. From point 202, the motor 114 rotates shaft 118 counterclockwise and lug 130 subsequently moves counterclockwise. However, since element 124 has moved in direction 204, the counterclockwise movement causes the lug to engage side wall 206 of slot 132a (the return movement of element 124 causes the lug and wall 206 to be circumferentially aligned). Thus, the correct positioning of the lug for the selected gear is ensured.

When the lug is in position 208, the appropriate protrusions 104 are axially aligned with pins 177. The counterclockwise movement of shaft 118 causes the lug to traverse slot 132a in direction 198 through segment 210 to position 212, causing tube 102 to axially displace in direction 198. The movement of the tube causes the protrusions to engage pins 177 as required. In general, corresponding gears are first interlocked and then the selected gear is locked. Lug 130 comes to rest at position 212 until the next gear select operation. The engagement of the protrusions and pins is further described supra.

During the initialization sequence of assembly 100, motor 114 turns clockwise pulling the tube in direction 204. Once ring gear 116 touches surface 170, the tube starts rotating clockwise. A controller (not shown) tracks the current profile of the motor and detects tube detent 180 by the sharp jump in current flowing through the motor, associated with the increased resistance to the motor movement by the engagement of detent 180 and protrusion 182. This engaged position corresponds to a known angle before the neutral gear position. The motor then continues past the next slot in one way clutch 124 and proceeds to select the neutral gear.

Figure 9:
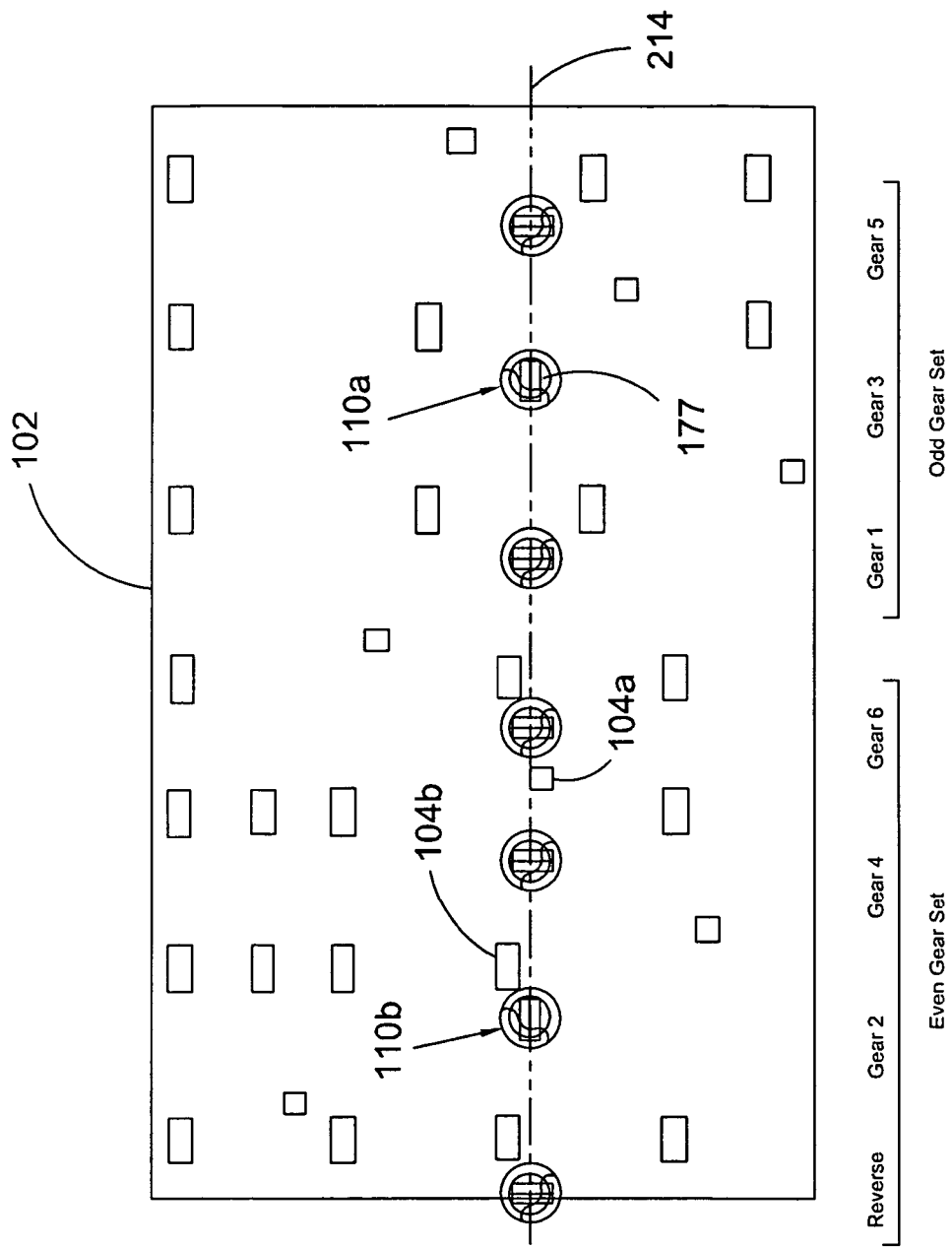
FIGS. 9 through 12 show a sequence of disengaging, interlocking, and engaging a new gear using the assembly shown in FIG. 1.

FIGS. 9 through 12 show a sequence of disengaging, interlocking, and engaging a new gear using assembly 100. The following should be viewed in light of FIGS. 1 through 12. In FIGS. 9-12, cylindrical tube 102 is opened out to a flat sheet to show engagement of protrusions 104 with assemblies 110 and assemblies 110 are shown in a top view. FIGS. 9 through 12 show the sequence of motion for tube 102 with respect to segment 210 in FIG. 8. In FIGS. 9 through 12 the position of the gear actuation assemblies 110 are fixed and tube 102 moves from right to left. During this movement, various protrusions 104 contact respective pins 177 as follows. In FIG. 9, the pin in assembly 110a for gear 3 is rotated to the engaged position, the clutch for gear 3 is engaged, the pin in assembly 110b for gear 2 is rotated to the engaged position, but the clutch for gear 2 is not carrying torque. The pins for the remaining gears are rotated to the disengaged position. Square protrusions, for example 104a, act to rotate pins into the engaged position and rectangular pins, for example 104b, act to rotate pins into the disengaged position.

Figure 10:
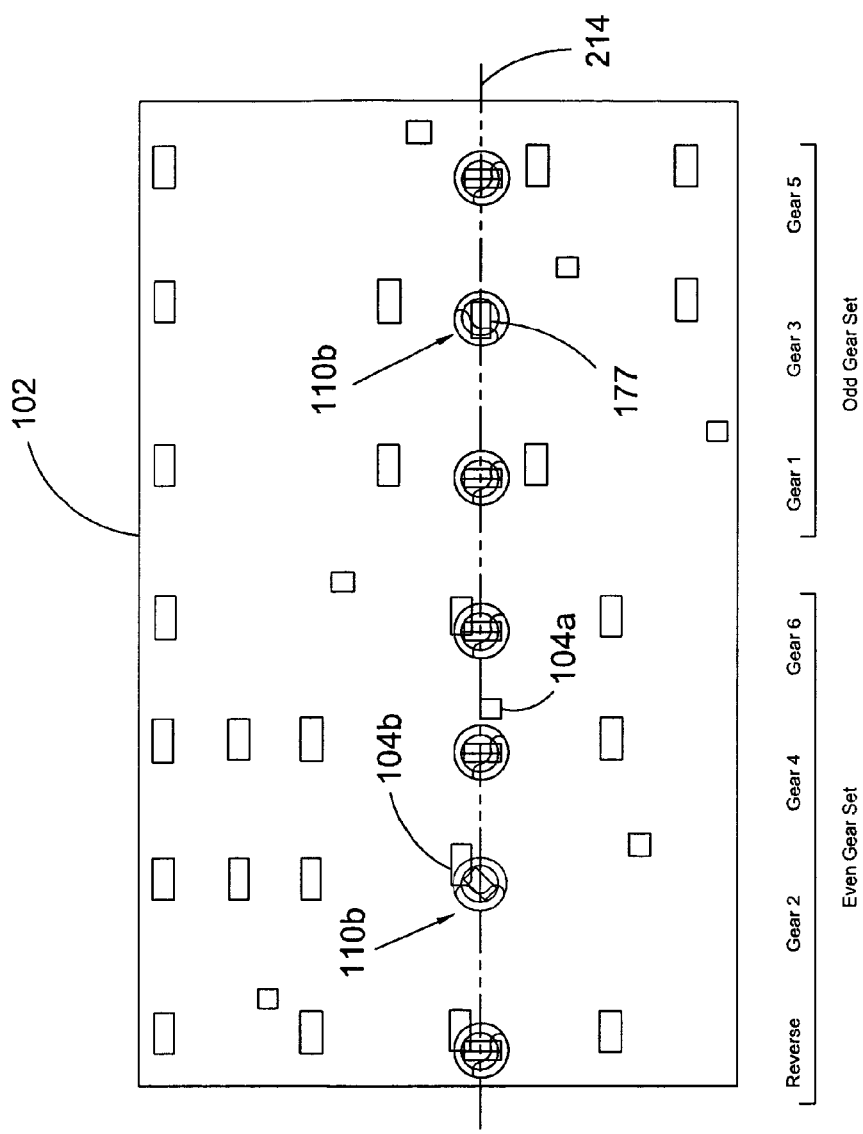
Figure 11:
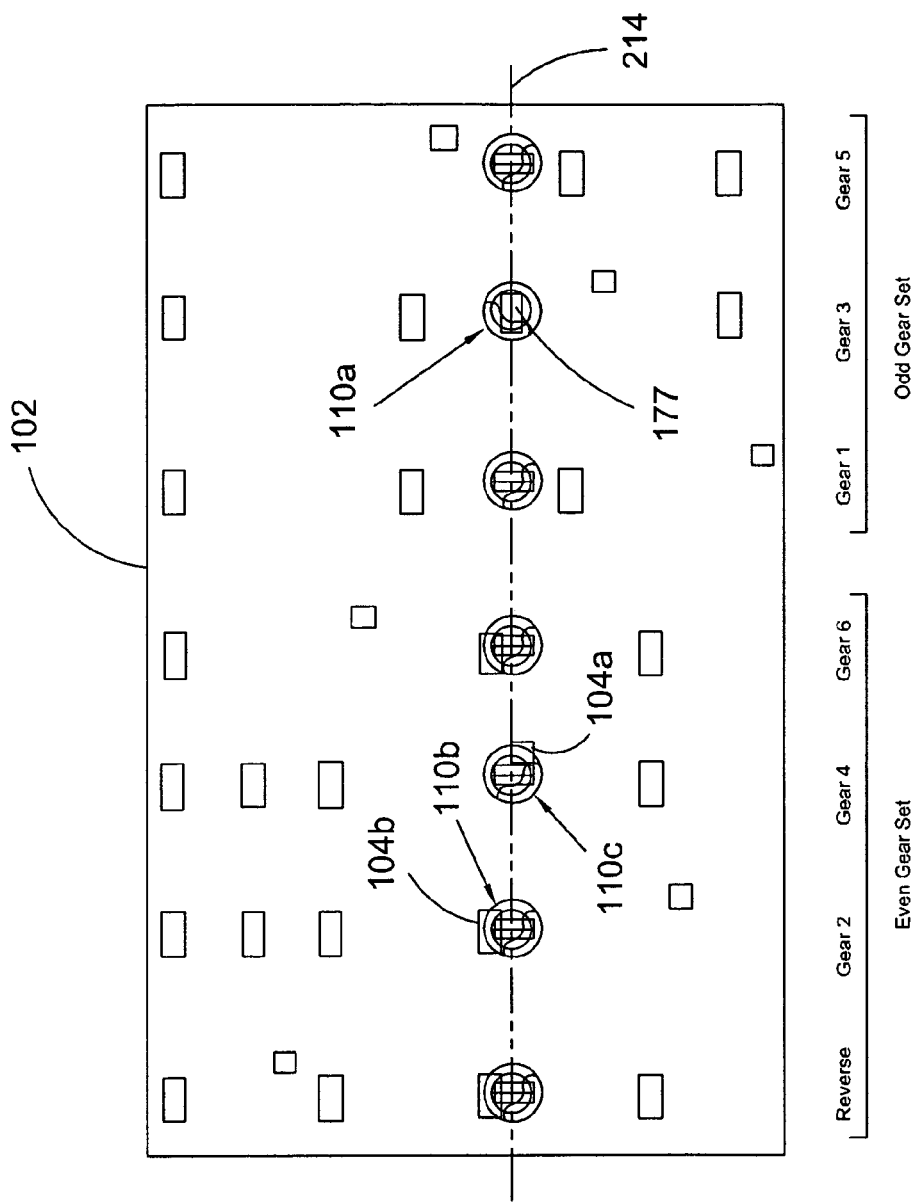
Figure 12:
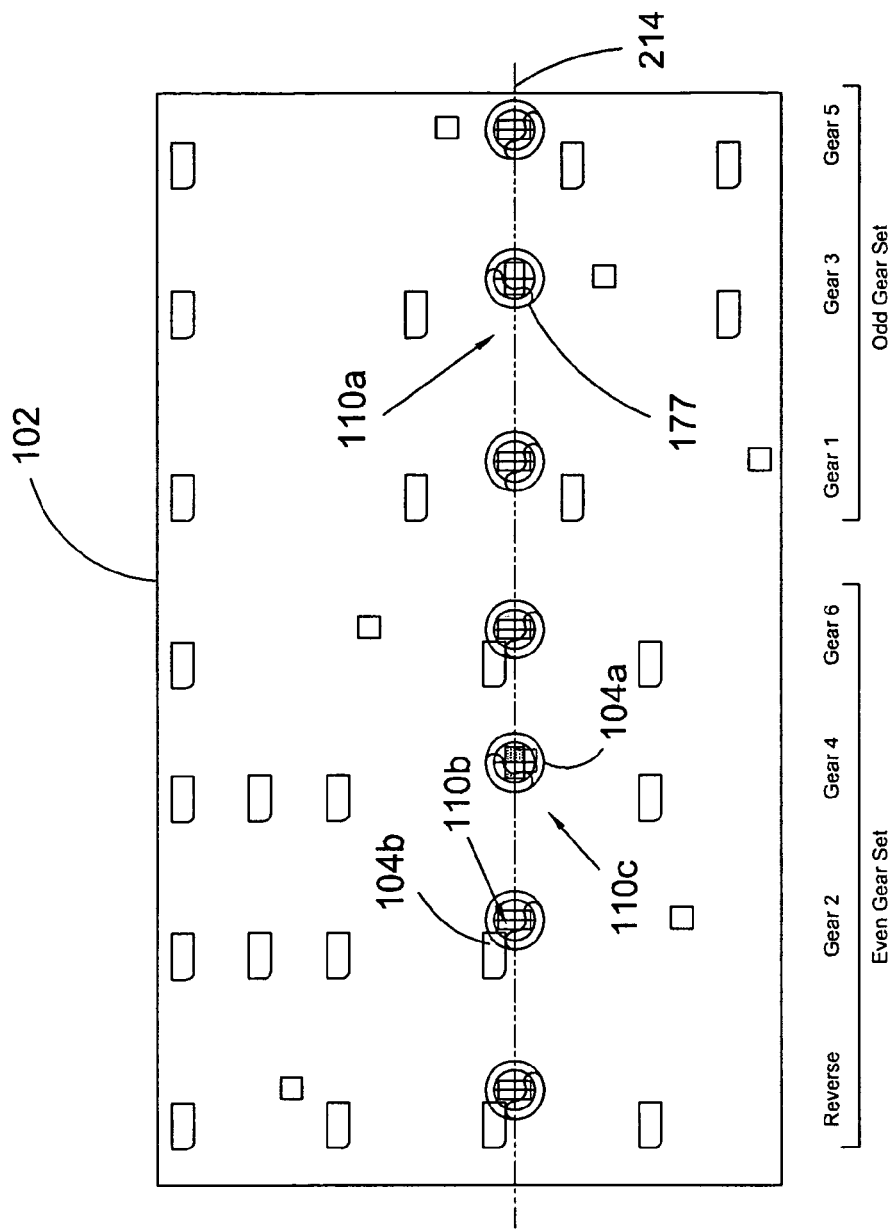

In FIG. 10, protrusion 104b has contacted the pin in assembly 110b to begin to rotate the pin to the disengagement position. In FIG. 11, gear 2 has been disengaged and protrusion 104a has contacted the pin in assembly 110c to begin rotation to the engagement position. In FIG. 12, gear 4 is fully engaged. Gear 3 remains engaged, however, the clutch for gear 3 does not carry torque, similar to the arrangement for gear 2 in FIG. 9. By engaging more than one pin 177 with a respective protrusion 104, assembly 100 is able to preselect a gear for engagement. For example, as shown above, while gear 3 was still engaged, gear 4 was preselected.

Figure 13:
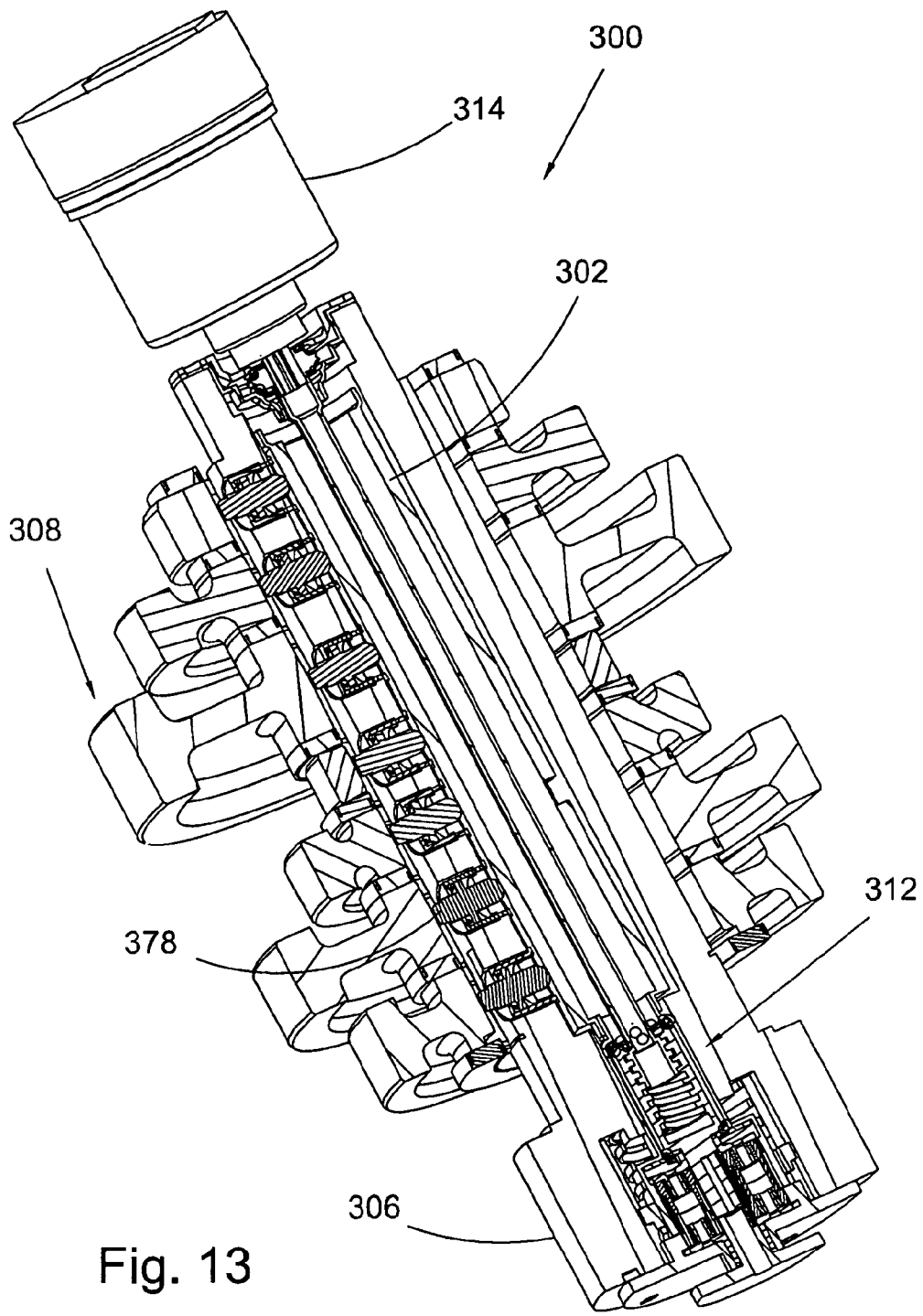
FIG. 13 is a cross-sectional view of a present invention gear selection assembly with rotational activation.

FIG. 13 is a cross-sectional view of present invention gear selection assembly 300 with rotational activation.

Figure 14:
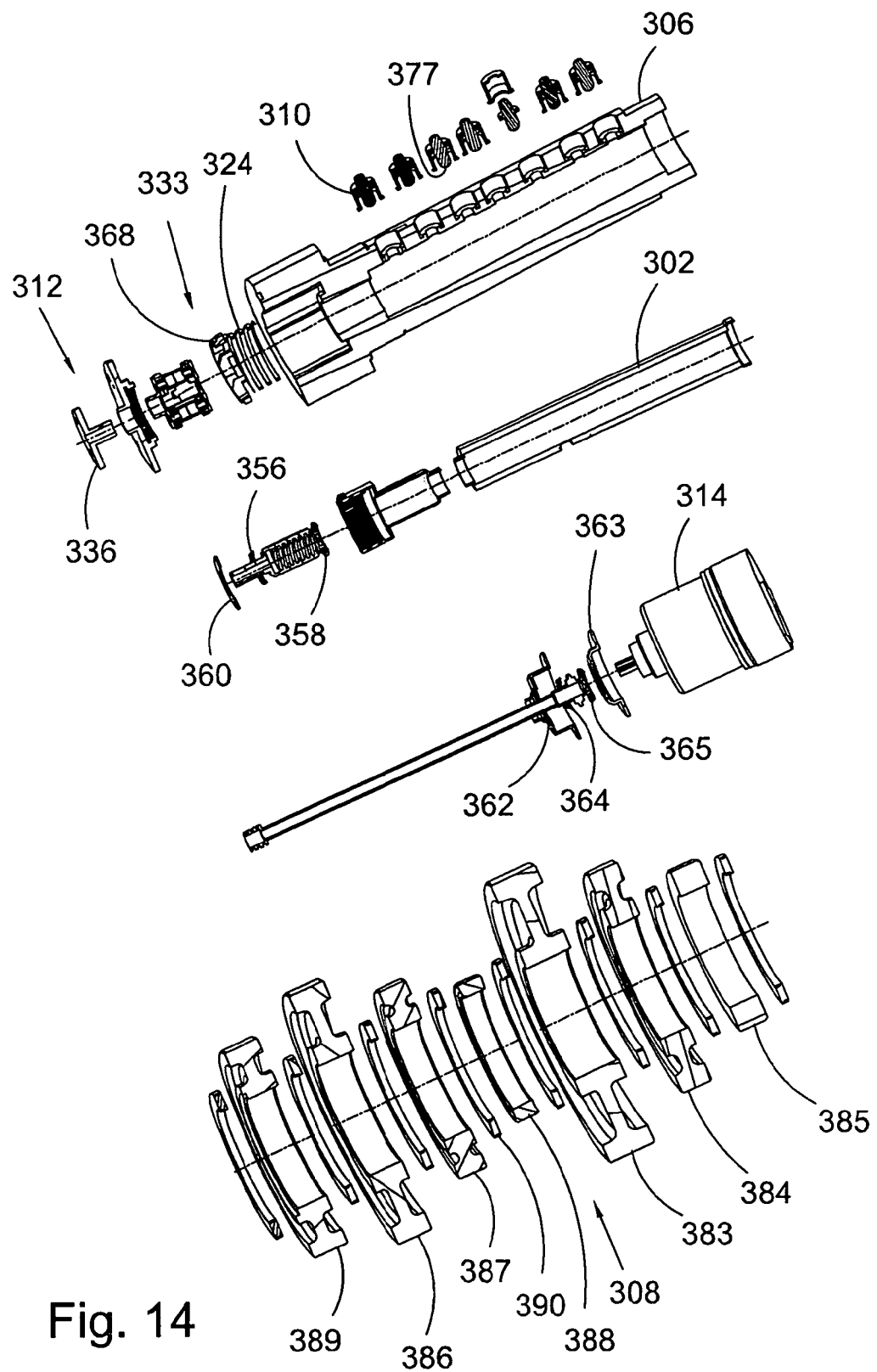
FIG. 14 is an exploded view of the assembly and drive shaft in FIG. 13.

FIG. 14 is an exploded view of assembly 300 and drive shaft in FIG. 13.

Figure 15:
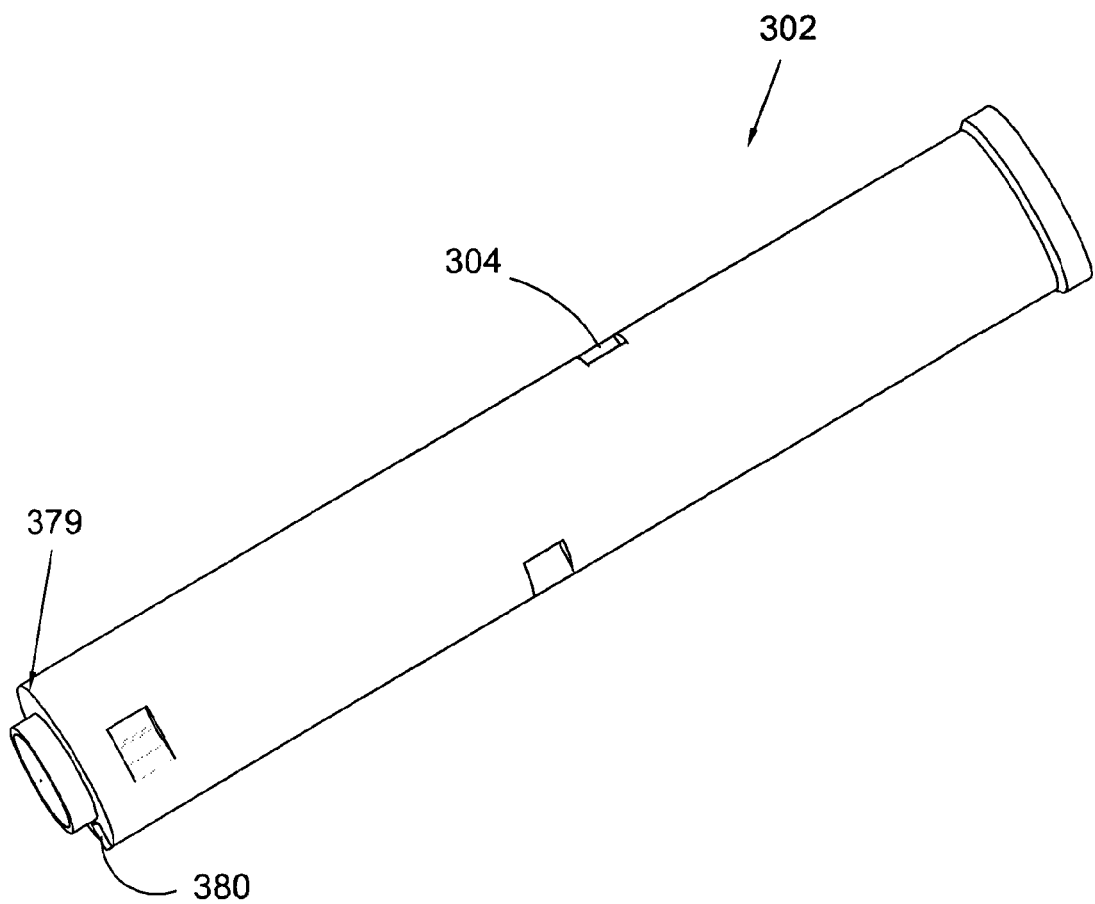
FIG. 15 is a perspective view of the tube in FIG. 13.

FIG. 15 is a perspective view of the tube in FIG. 13.

Figure 16:
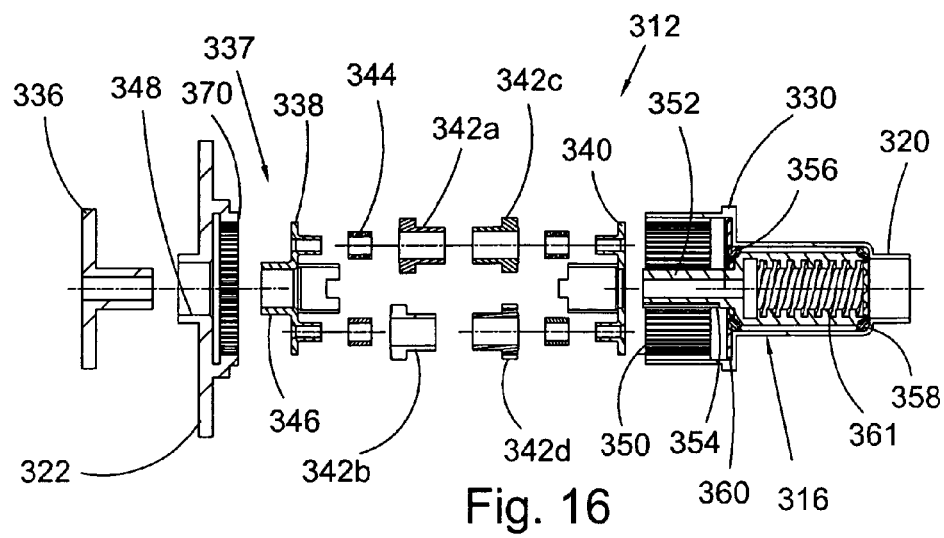
FIG. 16 is an exploded view of the differential rotation element in FIG. 13.

FIG. 16 is an exploded view of differential rotation element 312 in FIG. 13. The following should be viewed in light of FIGS. 13 through 16. Assembly 300 includes tube 302 with at least one engagement feature 304. In some aspects, feature 304 is an indent. Tube 302 is arranged to be disposed in drive shaft 306 for a transmission (partially shown). The transmission includes at least one gear 308 and drive shaft 306 includes at least one gear actuation assembly 310. In the description that follows, at least one gear 308 is a plurality of gears, however, it should be understood that at least one gear 308 can be a single gear.

Assembly 300 includes differential rotation element 312 coupled with tube 302 and arranged to be coupled with the drive shaft so that tube 302 is differentially rotatable with respect to the drive shaft. Tube 302 is arranged to differentially rotate such that engagement features 304 engage gear actuation assemblies 310 and the transmission engages a respective gear from gears 308. Assembly 300 also includes means 314 for displacing portion 316 of differential rotation element 312 such that tube 302 axially and rotationally displaces with respect to the drive shaft. Means 314 includes shaft 318 connected to portion 316 and arranged to transfer rotational motion to portion 316. In some aspects, means 314 is an actuator, shaft 318 is connected to the actuator, and the actuator is arranged to rotate the shaft. It should be understood that any actuator known in the art, such as a hydraulic actuator, can be used for actuator 314. In FIGS. 13 through 15, the actuator is an electric motor.

In some aspects, element 312 is a gear set. In some aspects, the gear set is a planetary gear set, for example, as shown in FIG. 13. Then, ring gear 316 is the portion of element 312 displaced by means 314. Gear 316 is fixedly secured to tube 302 at end 320 and ring gear 322 is arranged to be fixedly secured to the drive shaft.

Figure 17:
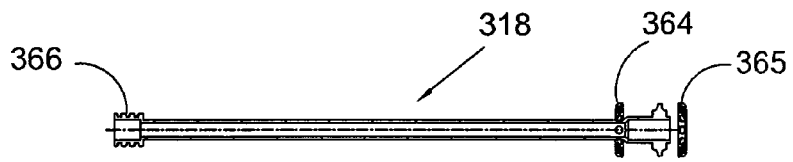
FIG. 17 is a cross-sectional view of the shaft for the displacing means in FIG. 13.

FIG. 17 is a cross-sectional view of shaft 318 in FIG. 13.

Figure 18:
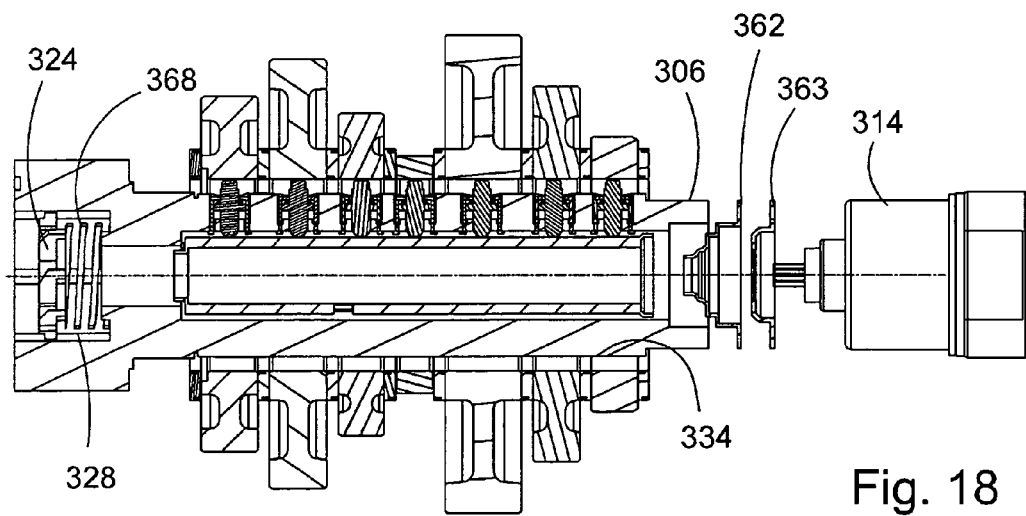
FIG. 18 is a cross-section view of the drive shaft and interface assembly in FIG. 13.

FIG. 18 is a cross-section view of drive shaft 306 and the interface assembly in FIG. 13.

Figure 19:
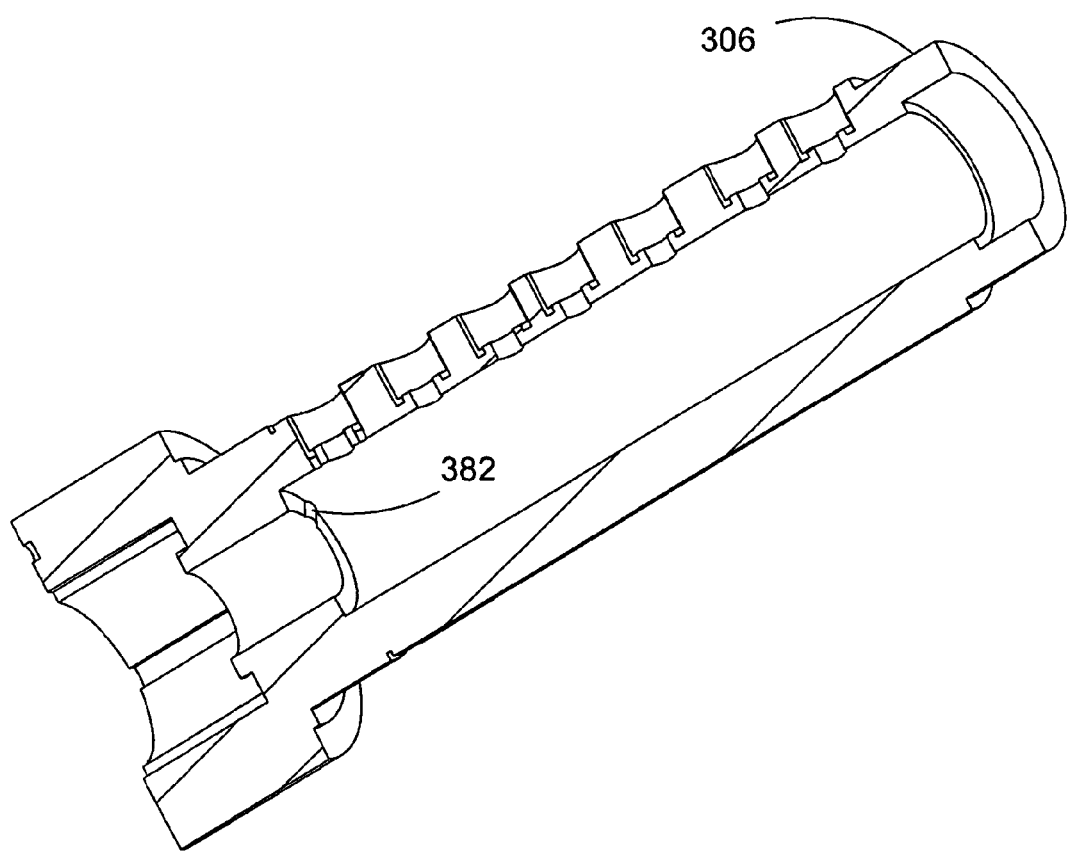
FIG. 19 is a perspective cross-section view of the drive shaft in FIG. 13.

FIG. 19 is a perspective cross-section view drive shaft 106 in FIG. 13.

Figure 20:
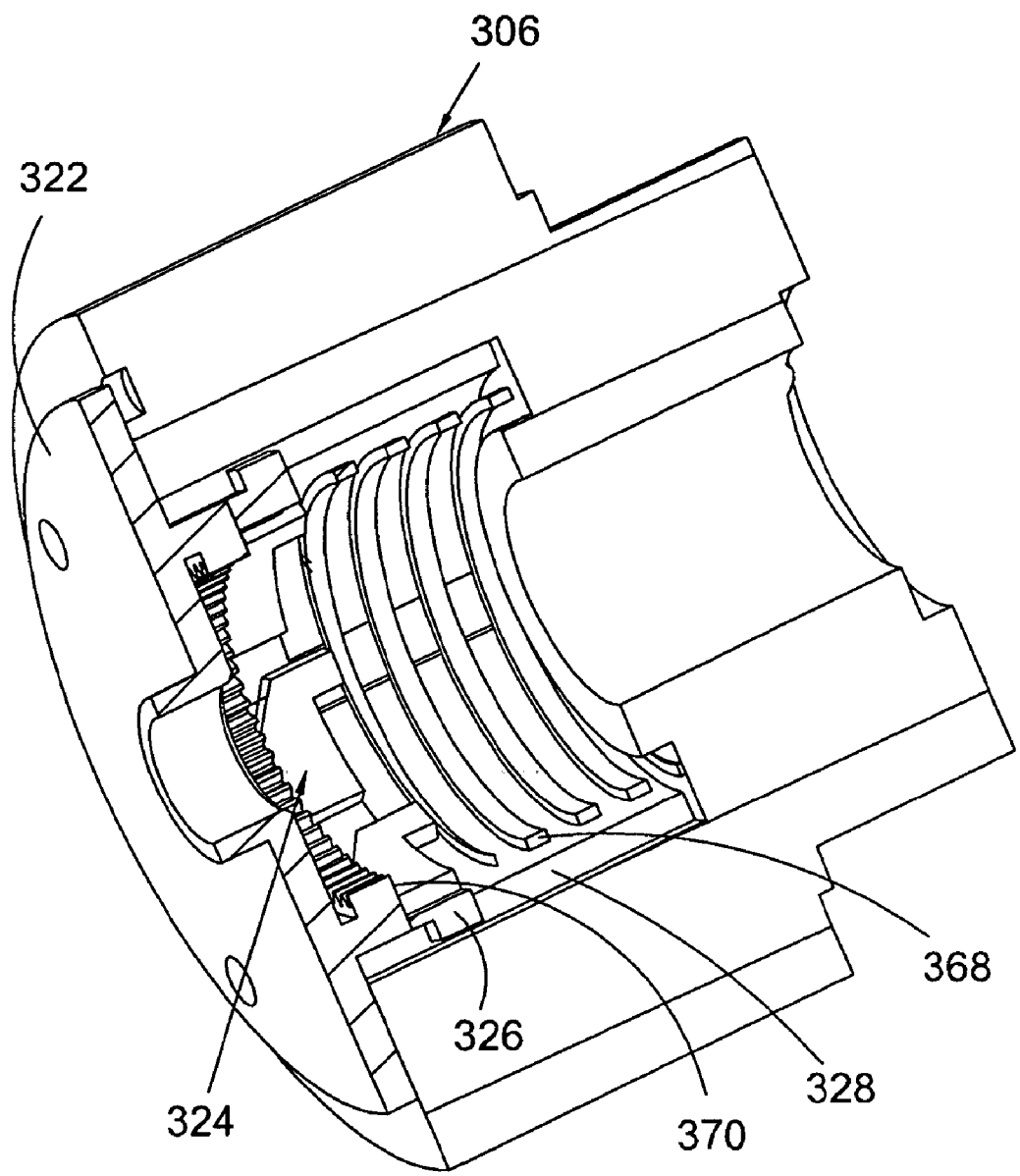
FIG. 20 is a detail of FIG. 13 showing the interface element and drive shaft.

FIG. 20 is a detail of FIG. 13 showing interface element 324 and the drive shaft.

Figure 21:
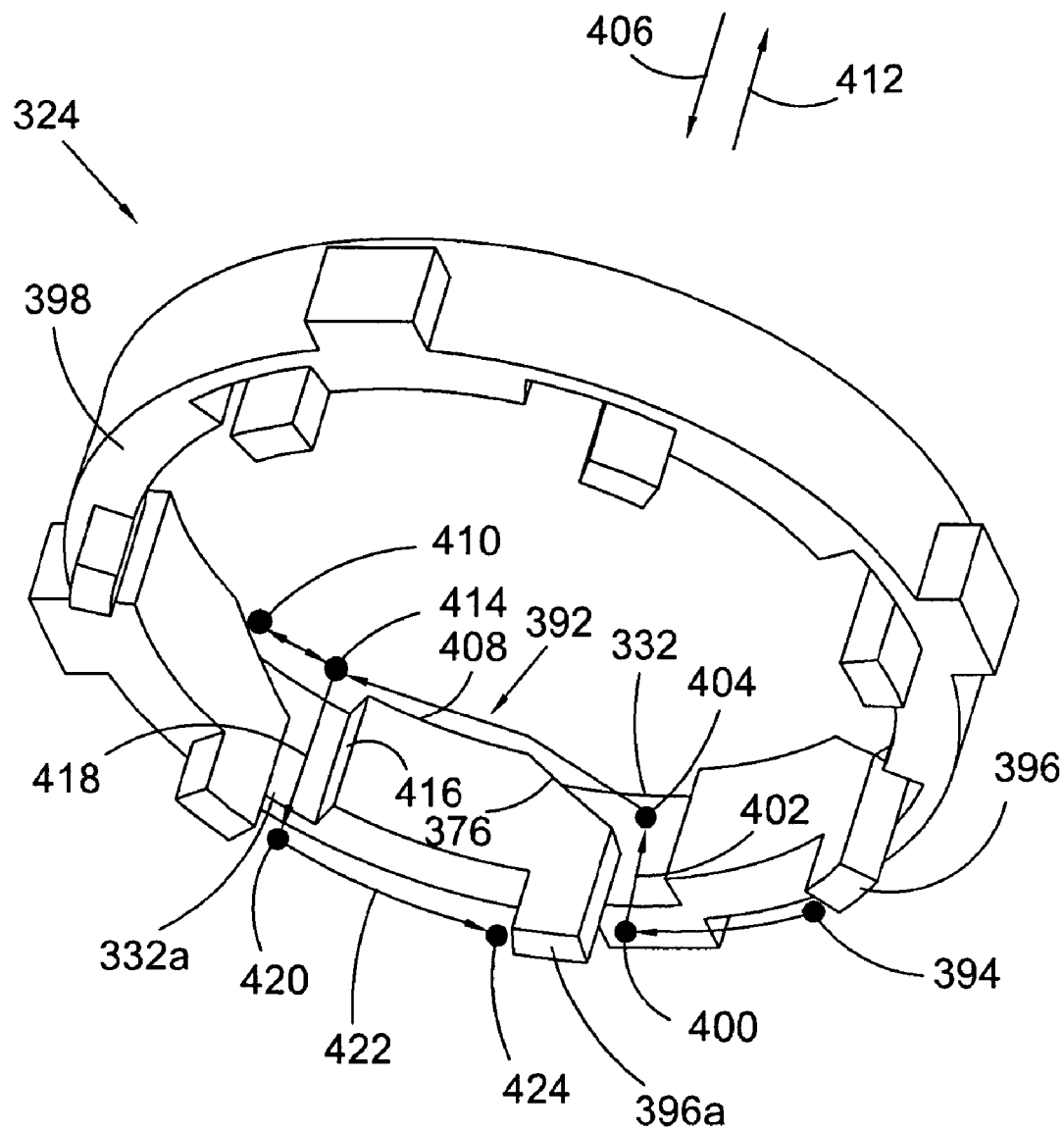
FIG. 21 is a perspective cross-sectional view of the interface element in FIG. 13.

FIG. 21 is a perspective cross-sectional view of the interface element. The following should be viewed in light of FIGS. 13 through 21. Assembly 300 includes interface element 324 arranged to be disposed within the drive shaft and rotationally fixed to the drive shaft. Element 324 is axially displaceable with respect to the drive shaft due to the interface of lugs 326 on the element and matching grooves 328 in the drive shaft. Gear 316 axially and rotationally engages with the interface element to controllably position tube 302, as further described infra. In some aspects, controllably positioning the tube includes rotating the tube. In some aspects, controllably positioning the tube includes axially displacing the tube.

Carrier 316 includes at least one protrusion 330 and interface element 324 includes at least one slot 332. The protrusion is axially and rotationally displaceable through slots 332 as described infra.

The following is a more detailed description of the components of assembly 300. Assembly 300 includes planetary gear assembly 312; interface assembly, or one way clutch assembly, 333, which includes interface element 324; and tube 302, arranged to engage or connect to gear actuation assembly 310. When used with a single electric servo motor 314, these components can be used to engage up to two gears (one even and one odd) from the gear set 308. In some aspects, the actual engagement element is a slipper clutch (not shown) located in the cylindrical space between the outer diameter 334 of the drive shaft and the inner diameter of individual gears 308. Servo motor 314 is fixed to the gear box housing (not shown).

Planetary gear assembly 312 includes sun gear 336 fixed to the gear box housing (not shown). Planet carrier assembly 337 includes carriers 338 and 340 that carry four (4) rotatable planet gears 342a, 342b, 342c, 342d, each with a pressed in bronze bushings 344. The planet carrier assembly is positioned axially such planet gears 342a and 342b mate with the ring gear 322. Pilot 346 mates with internal pilot 348 for accurate radial position of the gear carrier 338.

Planet gears 342c and 342d mate with ring gear 316. Gear teeth 350 are cut longer than the widths of the planet gears to facilitate axial motion of gear 316 while still maintaining gear contact with gears 342c and 342d. Sun gear shaft 352 mates with planet gears 342c and 342d. Sun shaft 352 is rotatable, axially fixed, and radially centered in inside bore 354 of gear 316 using any means known in the art, for example, ball bearings 356 and 358. Plate 360 is fixed to gear 316 and axially fixes sun gear shaft 352 with gear 316. Any axial motion exhibited by the sun gear shaft is transmitted to ring gear 316 via ball bearings 356 and 358. Sun gear shaft 352 has an internal thread 361. The thread can be right handed or left handed. The gear on shaft 352 is similar to gear on sun gear 336 but longer in length. It should be understood that a present invention planetary gear assembly is not limited to the size, number, and configuration of components described supra.

Input shaft 318 is rotationally connected to servo motor 314 using any means known in the art. In some aspects, a bearing pack including element 362-365 supports shaft 318 drive shaft and axially fixes shaft 318. Shaft 318 also has internal splines matching splines on the motor. Thread 366 on shaft 318, mates with the internal thread 361. Members 362 and 363 are fixed rigidly to the drive shaft.

Interface assembly 333 includes interface element 324 and compression element 368. Element 368 can be any compression element known in the art, for example, a spring. Element 324 is fixed axially by element 368 and is fixed rotationally by clutch element lugs 326 and grooves 328. Spring 368 reacts against gear 322 to keep clutch member 324 firmly pressed against surface 370 of ring gear 322.

At least one lug 330 on the periphery of gear 316 rides inside a respective matching groove, or slot, 332 in one way clutch element 324, facilitating axial motion of member 316. Each of grooves 332 ends in a respective ramp 376. The ramps enable a smooth transition of gear 316 from axial to rotational motion in one direction. The ramps are used for transitioning from gear shift to gear select and from gear select to gear shift as described infra.

Individual engagement features, or cam lobes, in the form of depressions or indents, 304 on the surface of tube 302 function to either engage a particular gear 308 by letting spring loaded activation pin 378 lower itself into a lobe or disengage a particular lobe by rotating tube 302 to move the respective indent out of rotation with the pin, as further described below. Assembly 300 and indents 304 keep gear set 308 disengaged by default and engage a gear only when a lobe is presented directly below an actuation pin. This arrangement makes assembly 300 intrinsically safe by interlocking all gears except the gear being engaged. Thus, assembly 300 does not allow pre-selection of an even gear when an odd gear is engaged or vice versa. Only one gear (even or odd) is engaged at any one time.

Tube 302 is rigidly attached to end 320 of ring gear 316 by mating end 379. Thus, any movement in gear 316 is transmitted to the tube. End 379 of the tube has notched lug 380 that engages protrusion 382 in the drive shaft. This engagement process (described infra) generates a detent in the rotary motion of the tube facilitating the recognition of the rotary position of the tube by electronic motor controller 314. The protrusion on the drive shaft is oriented such that the detent occurs at a known angle before or after the neutral gear position.

In general, gear set 308 includes two groups of gears, for example, gears 383-385 are the odd gears and are placed on the drive shaft consecutively and members 386-388 are even gears, also placed consecutively with reverse gear 389. It should be understood that other numbers and combinations of gears can be used with assembly 300. Individual gears are separated as is known in the art, for example, by thrust bearings 390, to react axial thrust loads generated by gear set 108.

The following describes the operation of assembly 300 in further detail. Functionally, assembly 300 can be divided into two operations—gear select and gear shift. The two operations are achieved by appropriate manipulation of the assembly as described infra.

To initiate a gear select operation, the servo motor turns clockwise turning input shaft 318. Threads 366 mate with threads 361, moving gear shaft 352 axially towards gear 336. Shaft 352 is prevented from turning relative to the drive shaft by lug 330 riding in one of slots 332 of one way clutch element 324.

The following describes a sequence of positioning and movement of lug 330 with respect to element 324. Path 392 shows the approximate movement of lug 330 from an engaged position for assembly 300 though the gear selection process to the engagement of another gear in group 308. In the engaged position, lug 330 is approximately located at point 394 in contact with lug 396. It should be understood that in the engaged position, lug 330 is in contact with end 398 of element 324, but the exact location of point 394 can vary from that shown in FIG. 21.

To begin the select process, motor 314 rotates shaft 318 clockwise, as described supra, causing lug 330 to translate rotationally to reach alignment with the slot at position 400. This rotation causes the pin associated with the engaged gear to disengage from the respective indent in the tube. From position 400, the rotation of shaft 318 causes the lug to move axially through the slot since the slot opposes rotation of the lug. The lug translates axially through segment 402 until the lug reaches the ramp at position 404. During this translation, tube 302 also translates axially, but does not rotate. The axial movement of the tube causes indents 304 to misalign with pins 378. When the lug reaches the ramp, gear 316 contacts surface 370 and the force transmitted by shaft 318 causes the lug to rotate clockwise and ride up the ramp, which causes element 324 to axially slide in direction 406. The motor continues to rotate shaft 318 clockwise along surface 408 until the lug reaches point 410, which is known to be further clockwise than the desired position for lug 330 with respect to slot 332a (associated with the selected gear). The axial movement of the tube through segment 402 causes indents 304 to misalign with pins 378. Therefore, the rotation of the tube is performed without engaging pins 378. As the lug clears surface 408, spring 368 pushes element 324 back in direction 412 until the element again rests against surface 370. From point 410, the motor 314 rotates shaft 318 counterclockwise and lug 330 subsequently moves counterclockwise to position 414. However, since element 324 has moved in direction 412, the counterclockwise movement causes the lug to engage side wall 416 of slot 332a (the return movement of element 324 causes the lug and wall 416 to be circumferentially aligned). Thus, the correct positioning of the lug for the selected gear is ensured.

The continued rotation of shaft 318 draws lug 330 axially through slot 332a and segment 418 until the lug reaches position 420. This axial movement causes realignment of indents 304. From position 420, the lug is able to rotate through segment 422 to contact lug 396a, at which time the indent for the selected gear aligns with the actuation assembly for the selected gear and the respective pin drops into the indent. Lug 330 comes to rest at position 424 until the next gear select operation.

During the initialization sequence of assembly 300, motor 314 turns clockwise pushing the tube in direction 412. Once ring gear 316 touches surface 370, the tube starts rotating counter clockwise. A controller (not shown) tracks the current profile of the motor and detects tube detent 380 by the sharp jump in current flowing through the motor, associated with the increased resistance to the motor movement by the engagement of detent 380 and protrusion 382. This engaged position corresponds to a known angle before the neutral gear position. The motor then continues past the next slot in one way clutch 324 and proceeds to select the neutral gear.

Figure 22:
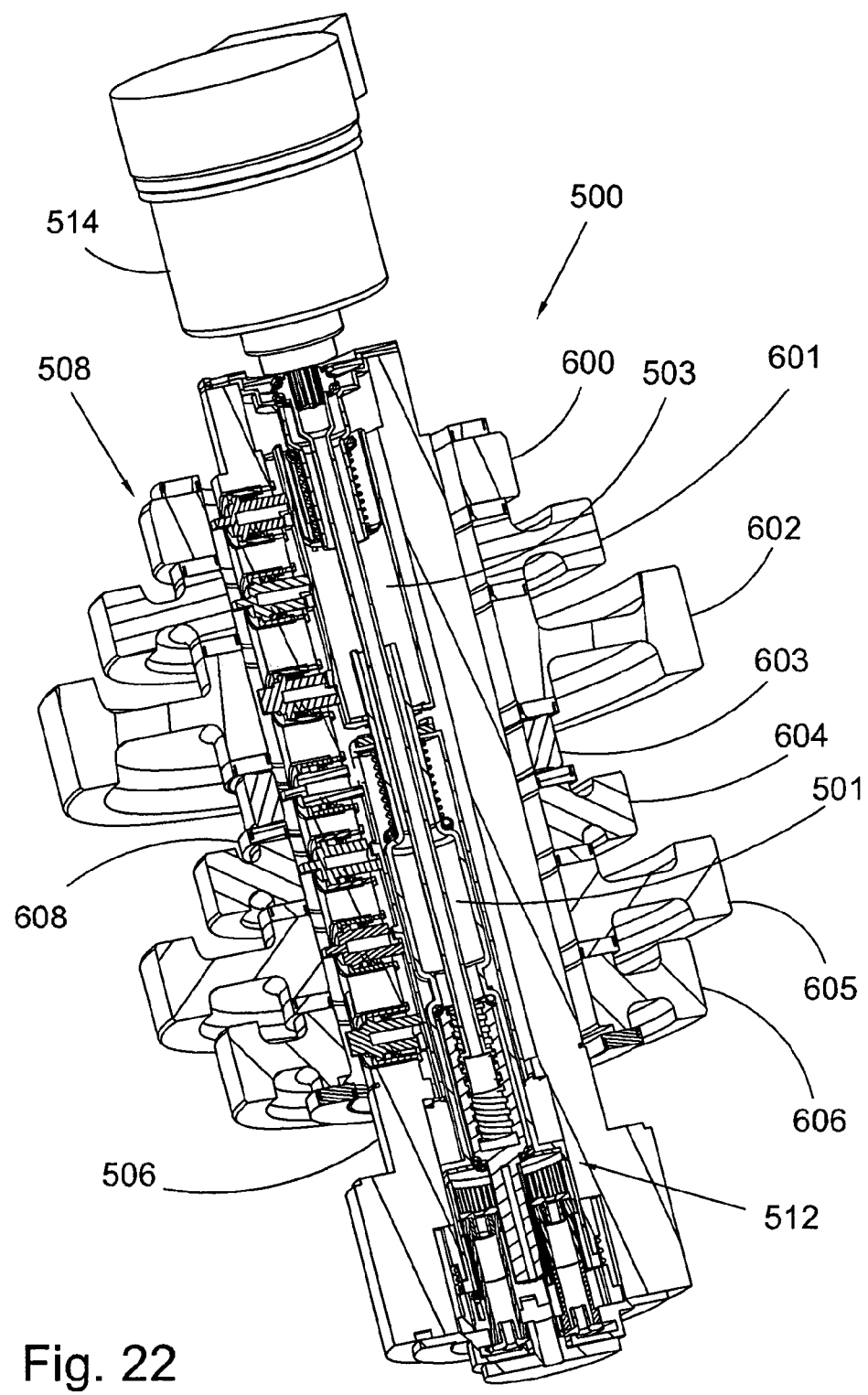
FIG. 22 is a cross-sectional view of a present invention gear selection assembly with dual tubes and rotational activation.

FIG. 22 is a cross-sectional view of present invention gear selection assembly 500 with dual tubes and rotational activation.

Figure 23:
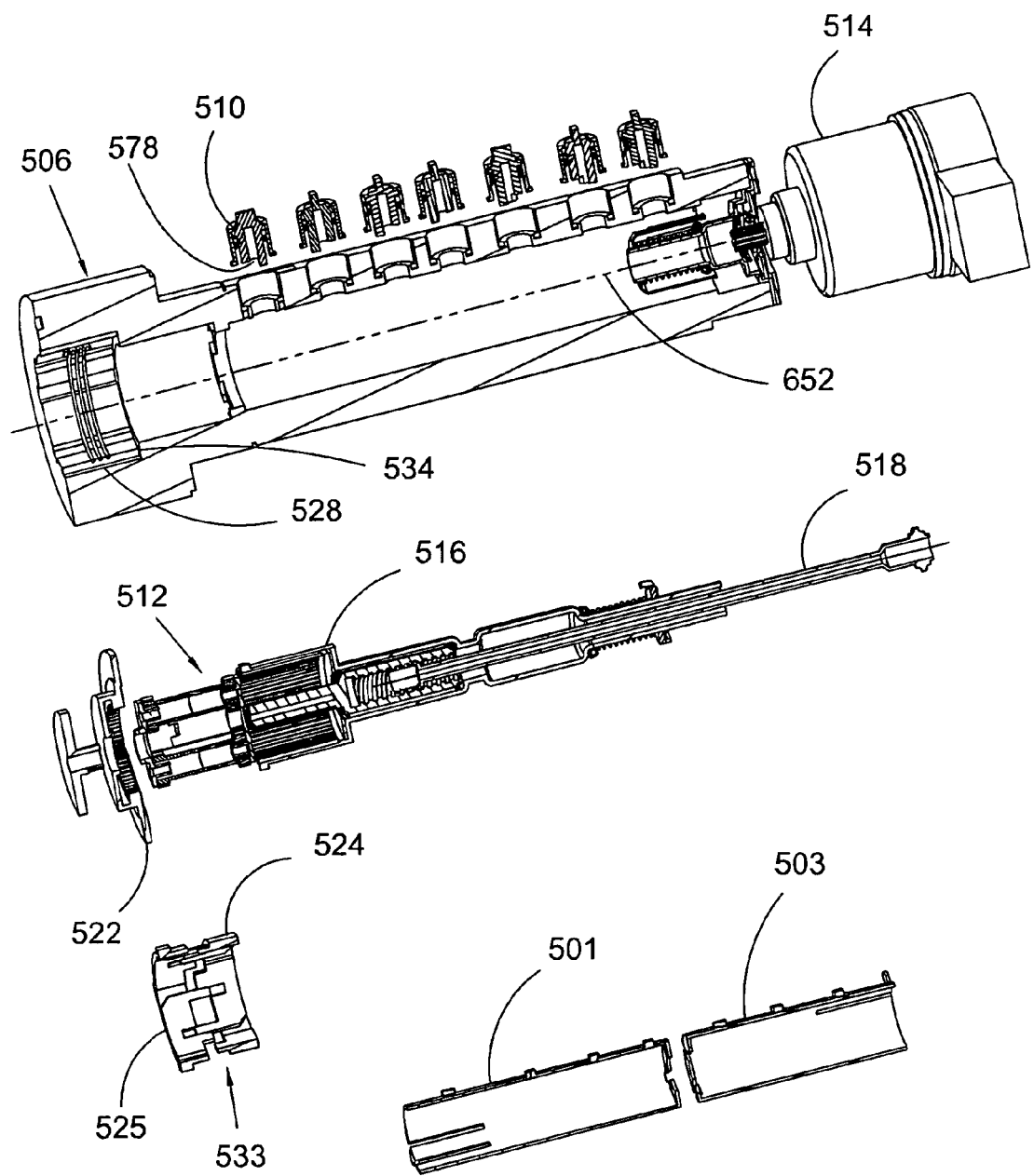
FIG. 23 is a partial exploded view of the assembly in FIG. 22.

FIG. 23 is a partial exploded view of assembly 500 in FIG. 22.

Figure 24:
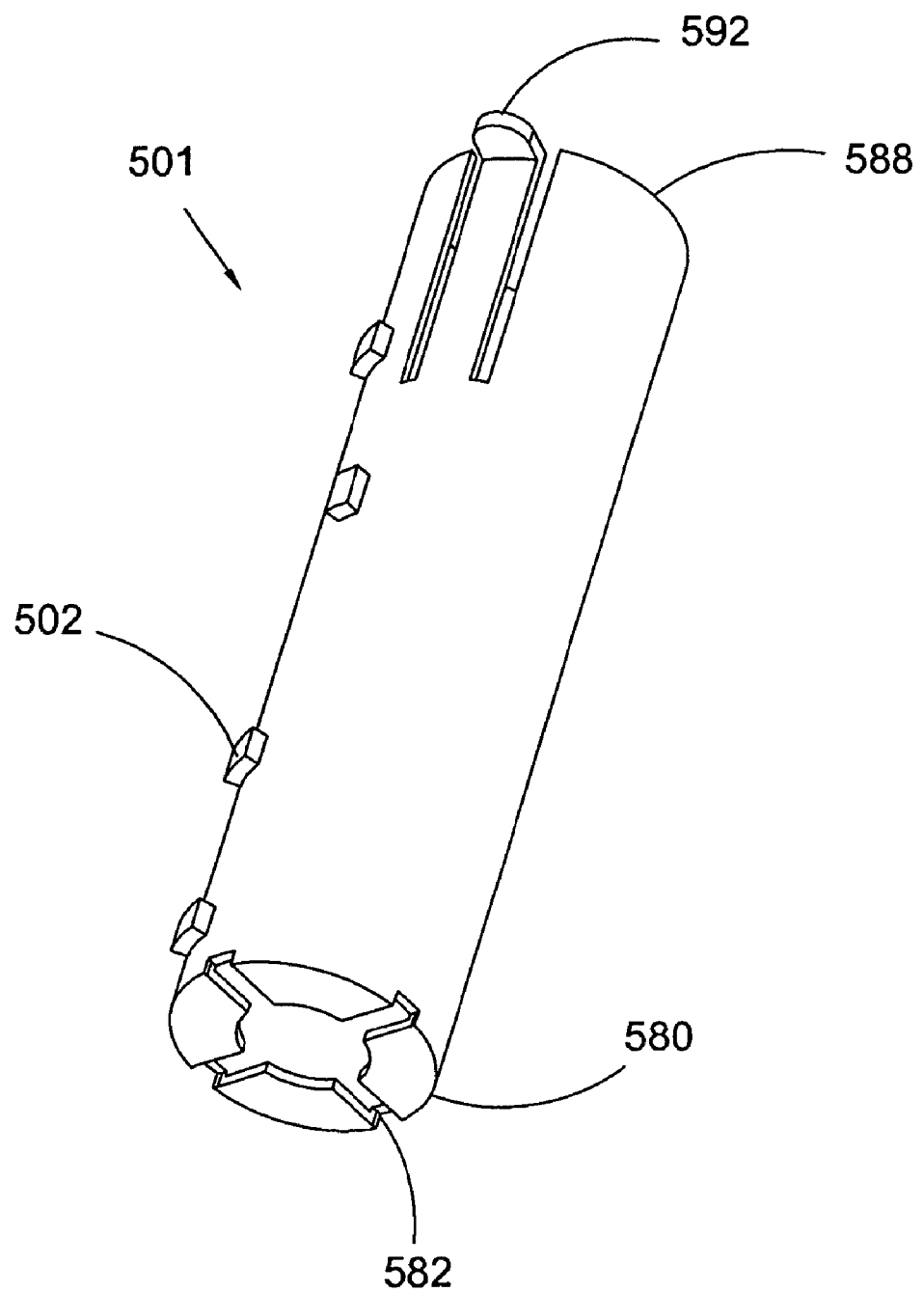
FIG. 24 is a perspective view of the even gear tube in FIG. 22.

FIG. 24 is a perspective view of the even gear tube in FIG. 22.

Figure 25:
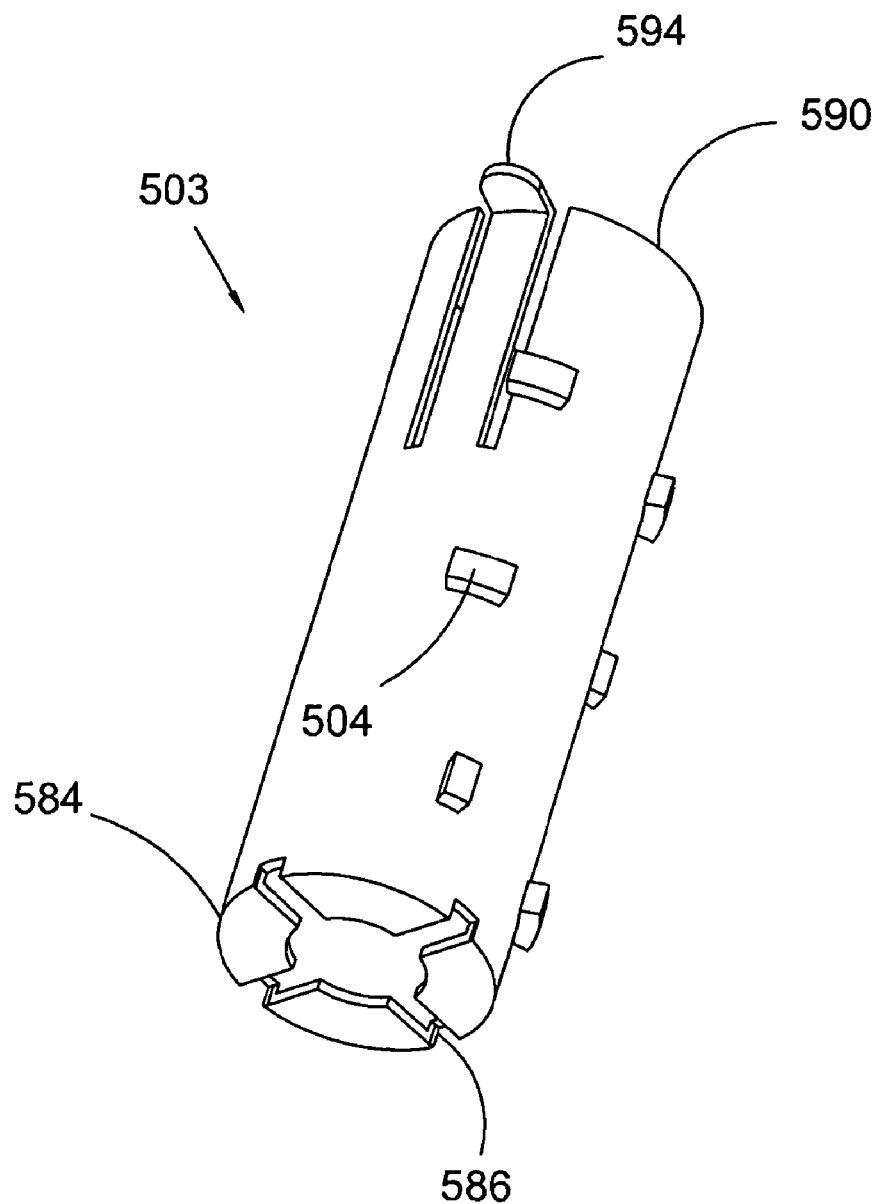
FIG. 25 is a perspective view of the odd gear tube in FIG. 22.

FIG. 25 is a perspective view of the odd gear tube in FIG. 22. The following should be viewed in light of FIGS. 22 through 25. Assembly 500 includes even gear tube 501 with at least one engagement feature 502 and odd gear tube 503 with at least one engagement feature 504. In some aspects, features 502 and 504 are protrusions. Tubes 501 and 502 are arranged to be disposed in drive shaft 506 for a transmission (partially shown). The transmission includes at least one gear 508 and drive shaft 506 includes at least one gear actuation assembly 510. In the description that follows, at least one gear 508 is a plurality of gears, however, it should be understood that at least one gear 508 can be a single gear.

Assembly 500 includes differential rotation element 512 independently coupleable with tubes 501 and 503 as described infra. Element 512 is arranged to be coupled with the drive shaft so that tubes 501 and 503 are independently differentially rotatable with respect to the drive shaft. The tubes are arranged to differentially rotate such that engagement features 502 and 504 engage respective gear actuation assemblies 510 and the transmission engages respective gear from gears 508. Assembly 500 also includes means 514 for displacing portion 516 of differential rotation element 512 such that the tubes axially and rotationally displace with respect to the drive shaft. Means 514 includes shaft 518 connected to portion 516 and arranged to transfer rotational motion to portion 516. In some aspects, means 514 is an actuator, shaft 518 is connected to the actuator, and the actuator is arranged to rotate the shaft. It should be understood that any actuator known in the art, such as a hydraulic actuator, can be used for actuator 514. In FIGS. 22 through 25, the actuator is an electric motor.

Figure 26:
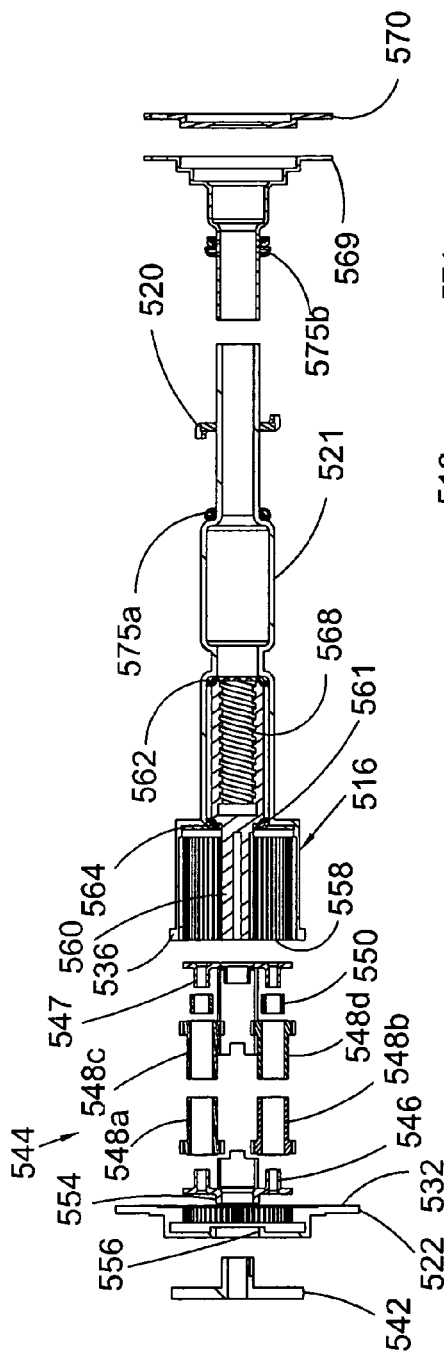
FIG. 26 is an exploded view of the differential rotation element in FIG. 22.

FIG. 26 is an exploded view of differential rotation element 512 in FIG. 22.

Figure 27:
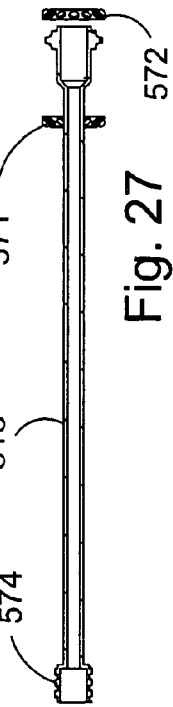
FIG. 27 is a cross-sectional view of the shaft for the displacing means in FIG. 22.

FIG. 27 is a cross-sectional view of shaft 518 for displacing means 514 in FIG. 22.

Figure 28:
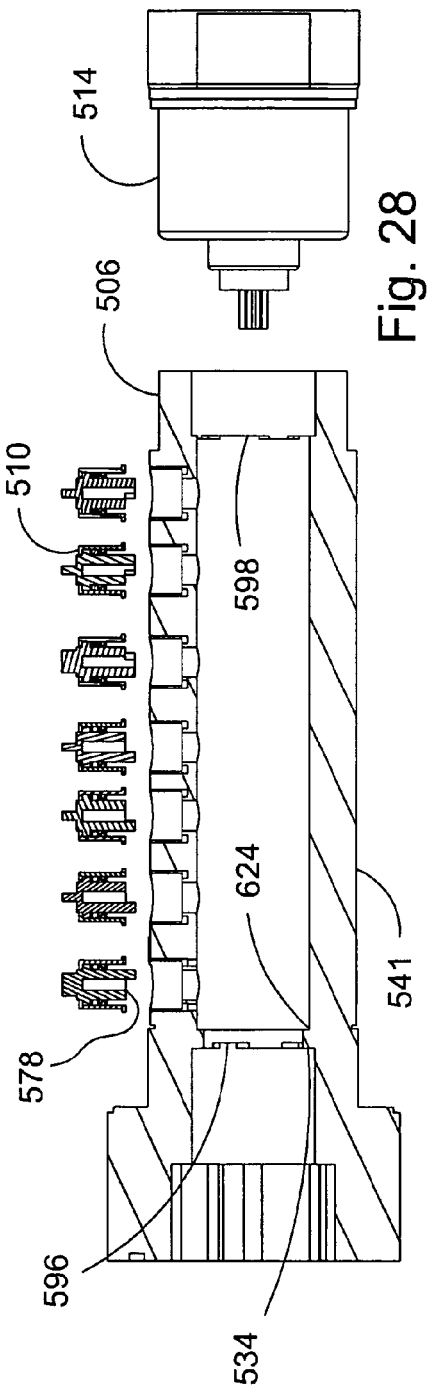
FIG. 28 is a cross-sectional view of the drive shaft in FIG. 22.

FIG. 28 is a cross-sectional view of drive shaft 506 in FIG. 22.

Figure 29:
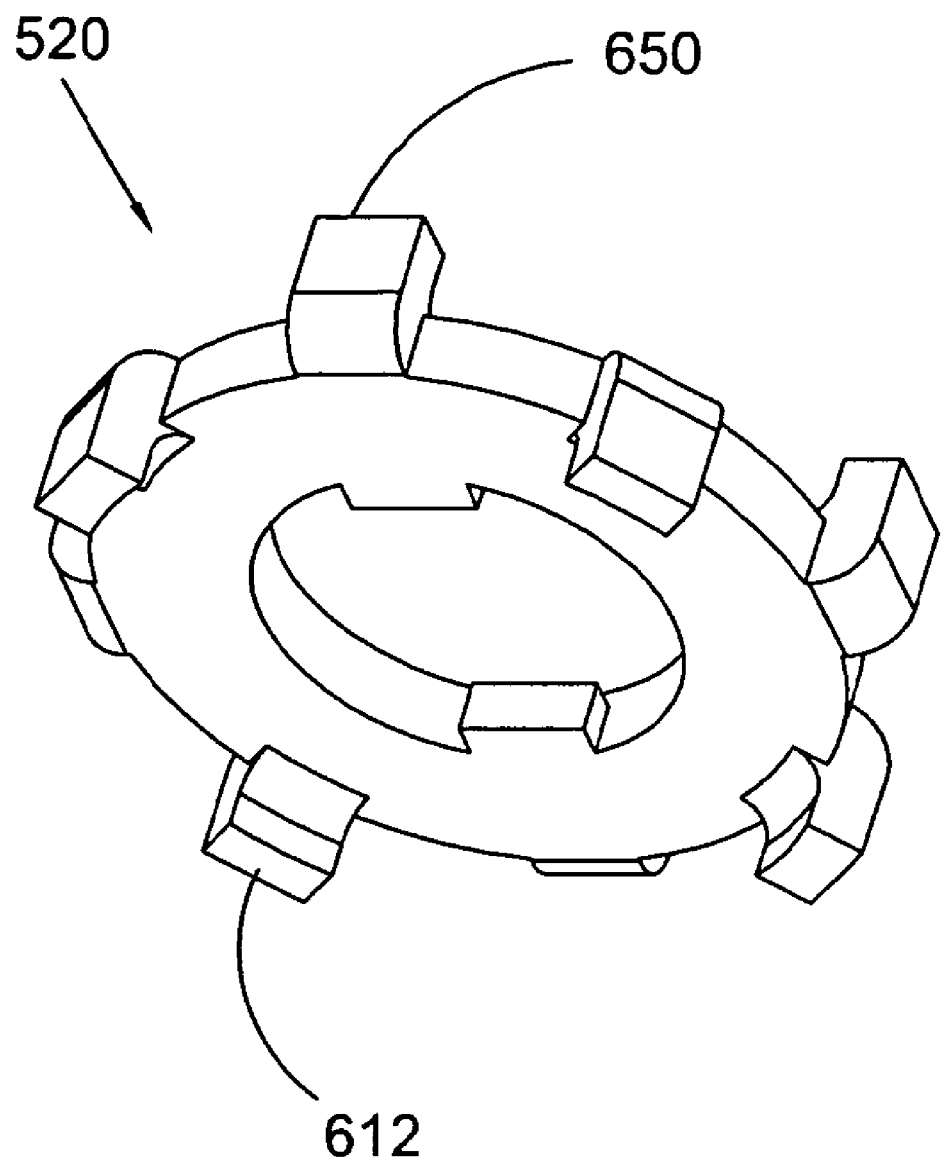
FIG. 29 is a perspective view of the tube socket in FIG. 22.

FIG. 29 is a perspective view of the tube socket in FIG. 22. The following should be viewed in light of FIGS. 22 through 29. In some aspects, element 512 is a gear set. In some aspects, the gear set is a planetary gear set, for example, as shown in FIG. 22. Then, ring gear 516 is the portion of element 512 displaced by means 514. Tube socket 520 is fixedly secured to extended housing 521 of carrier 516 and ring gear 522 is arranged to be fixedly secured to the drive shaft. The operation of the tubes and the tube socket is further described infra.

Figure 30:
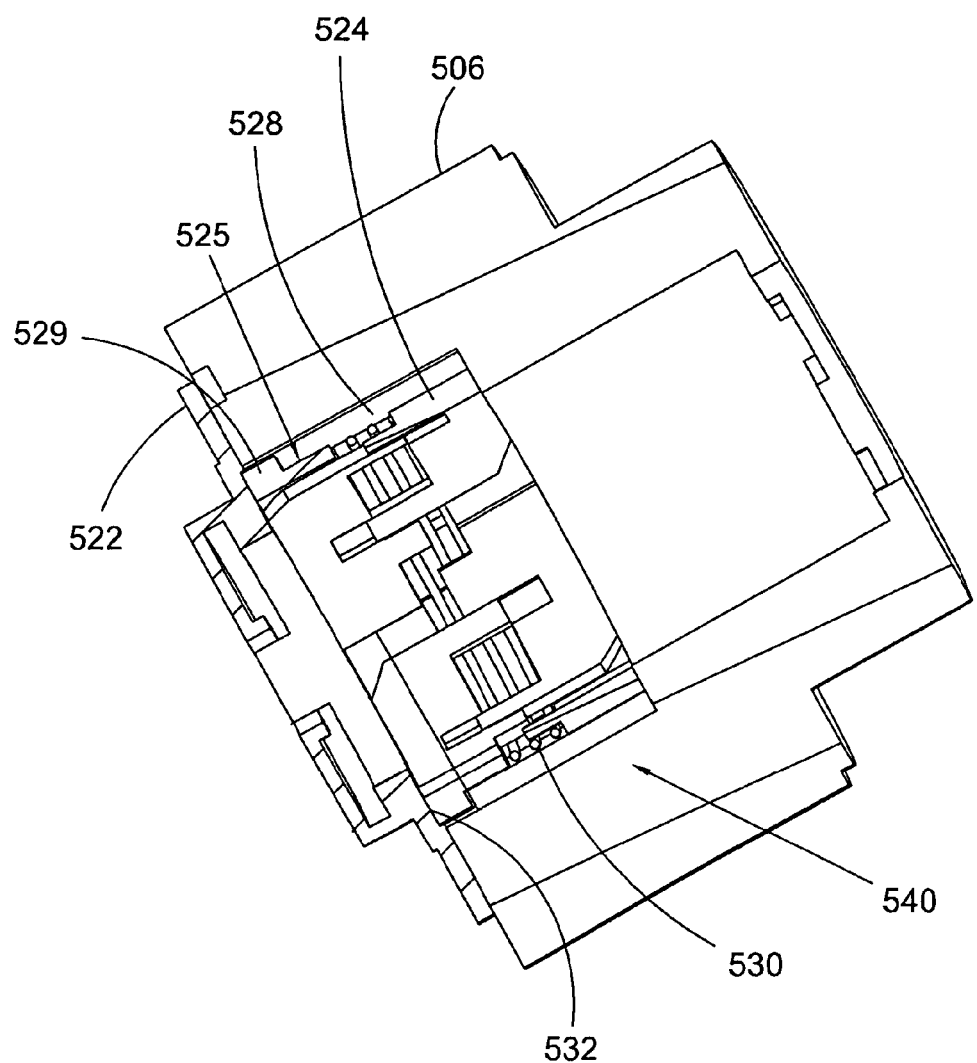
FIG. 30 is a detail of FIG. 22 showing the interface element and drive shaft.

FIG. 30 is a detail of FIG. 22 showing interface element 524 and the drive shaft.

Figure 31:
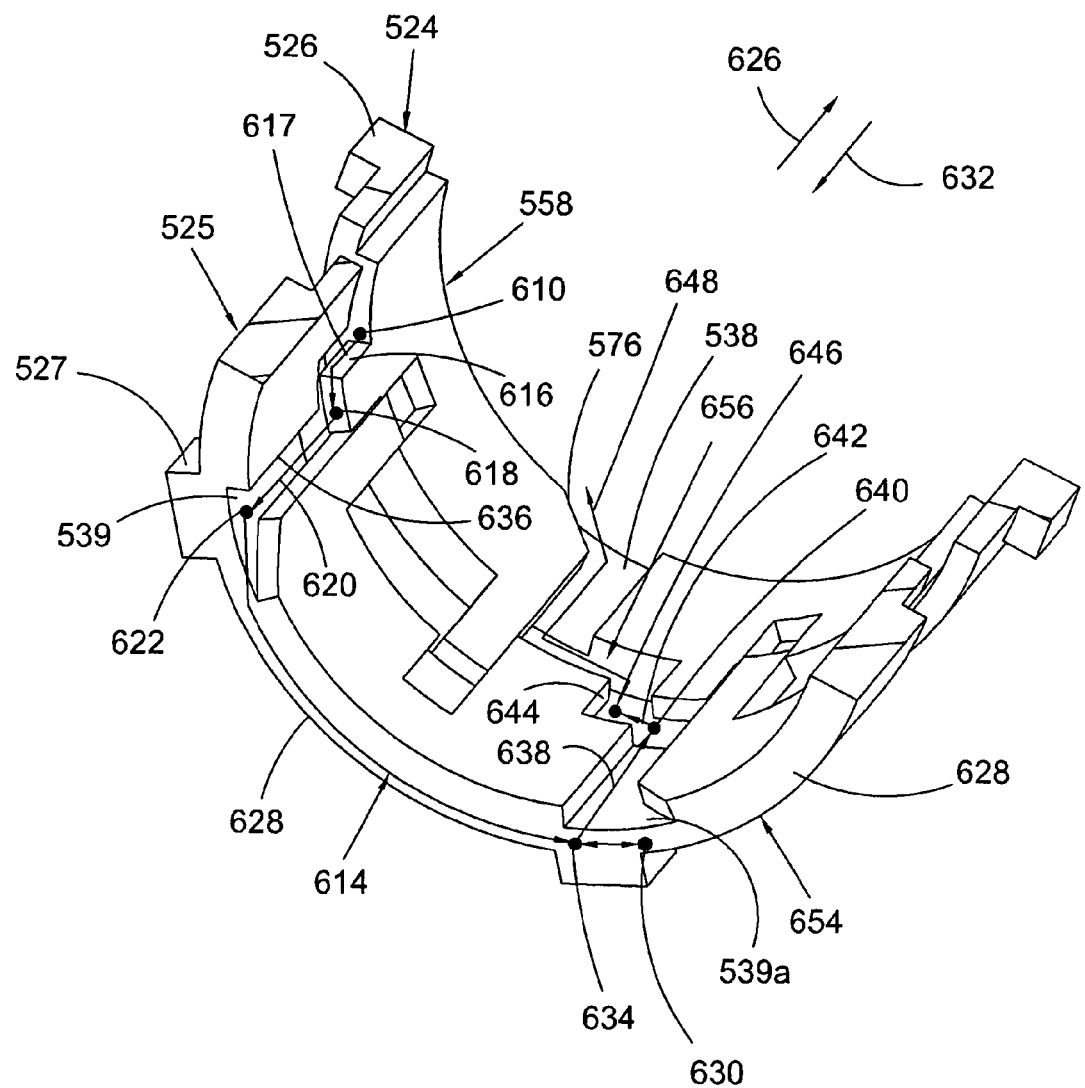
FIG. 31 is a perspective cross-sectional view of the interface assembly in FIG. 22.

FIG. 31 is a perspective cross-sectional view of the interface element. The following should be viewed in light of FIGS. 22 through 31. Assembly 500 includes interface elements 524 and 525 arranged to be disposed within the drive shaft and rotationally fixed to the drive shaft. Element 524 and 525 are axially displaceable with respect to the drive shaft due to the interface of lugs 526 and 527, respectively, on the elements and matching grooves 528 in the drive shaft. Compression spring 530 is axially disposed between elements 524 and 525 and urges the elements axially apart. Spring 530 urges element 525 against surface 532 of ring gear 522 and urges element 525 against surface 534 of the drive shaft. Carrier 516 axially and rotationally engages with the interface elements to controllably position the tubes, as further described infra. In some aspects, controllably positioning the tubes includes rotating the tubes. In some aspects, controllably positioning the tubes includes axially displacing the tubes.

Carrier 516 includes at least one protrusion 536 and interface elements 524 and 525 include at least one slot 538 and 539, respectively. The protrusion is axially and rotationally displaceable through the slots as described infra.

The following is a more detailed description of the components of assembly 500. Assembly 500 includes planetary gear assembly 512; interface assembly, or one way clutch 10 assembly, 540, which includes interface elements 524 and 525; and tubes 501 and 503, arranged to engage or connect to respective gear actuation assemblies 510. When used with a single electric servo motor 514, these components can be used to engage up to two gears (one even and one odd) from the gear set 508. In some aspects, the actual engagement element is a slipper clutch (not shown) located in the cylindrical space between the outer diameter 541 of the drive shaft and the inner diameter of individual gears 508. Servo motor 514 is fixed to the gear box housing (not shown).

Assembly 512 includes sun gear 542 fixed to the gear box housing (not shown) and ring gear 522 fixed to the drive shaft. Ring gear 516 includes axially extended housing 521. Planet carrier assembly 544 includes carriers 546 and 547 that carry four (4) rotatable planet gears 548a, 548b, 548c, 548d, each with a pressed in bronze bushings 550. The planet carrier assembly is positioned axially such that planet gears 548a and 548b mate with ring gear 522. Pilot 554 mates with internal pilot 556 for accurate radial position of the gear carrier 546.

Planet gears 548c and 548d mate with the ring gear 516. Gear teeth 558 are cut longer than the widths of the planet gears to facilitate axial motion of gear 516 while still maintaining gear contact with gears 548c and 548d. Sun gear shaft 560 mates with planet gears 548c and 548d. Sun shaft 560 is rotatable, axially fixed, and radially centered in the inside bore of gear 516 using any means known in the art, for example, ball bearings 561 and 562. Plate 564 is fixed to gear 516 and axially fixes sun gear shaft 560 with gear 516. Any axial motion exhibited by the sun gear shaft is transmitted to ring gear 516 via ball bearings 561 and 562. Sun gear shaft 560 has an internal thread 568. The thread can be right handed or left handed. The gear on shaft 560 is similar to gear on sun gear 542 but longer in length. It should be understood that a present invention planetary gear assembly is not limited to the size, number, and configuration of components described supra.

Input shaft 518 is rotationally connected to servo motor 514 using any means known in the art. In some aspects, a bearing pack including element 569-572 supports shaft 518 drive shaft and axially fixes shaft 518. Shaft 518 also has internal splines matching splines on the motor. Thread 574 on shaft 518, mates with the internal thread 568. Members 569 and 570 are fixed rigidly to the drive shaft. Bearings 571a and 571b provide additional support.

Interface assembly 540 includes interface elements 524 and 525 and compression element 530. Element 530 can be any compression element known in the art, for example, a spring. Elements 524 and 525 are urged axially by element 530 and are fixed rotationally by clutch element lugs 526 and 527 and grooves 528.

At least one lug 536 on the periphery of gear 516 rides inside a respective is matching groove, or slot, 538 or 539 in one way clutch assembly 540, facilitating axial motion of member 516. Each of grooves 538 and 539 ends in a respective ramp 576. The ramps enable a smooth transition of gear 516 from axial to rotational motion in one direction. The ramps are used for transitioning from gear shift to gear select and from gear select to gear shift as described infra.

Individual engagement features, or protrusions, 502 and 504 on the surface of tubes 501 and 503, respectively, function to either engage a particular gear 508 by rotating an actuation pin 578 in a particular direction or disengage a gear 508 by rotating the corresponding actuation pin in the opposite direction, as further described below. Protrusions 502 and 504 are arranged such that before selecting a particular gear, all other gears of the same type (even or odd) are first disengaged and interlocked. This arrangement provides a positive step to prevent engaging two gear of the same type simultaneously.

End 580 of tube 501 has slots 582. The slots are arranged to receive tube socket 520 during an even gear select process. End 584 of tube 503 has slots 586. The slots are arranged to receive tube socket 520 during an odd gear select process. Ends 588 and 590 of tube 501 and 503, respectively, each include a pair of diametrically opposite protrusions 592 and 594, respectively. These protrusions act as a spring loaded holding detent that mates with corresponding notches 596 and 598, respectively, in the drive shaft. The protrusions and notches hold the orientation of the respective tube when the other tube is being manipulated by ring gear 516. Socket 520 is rigidly fixed ring gear 516. Any movement in ring gear 516 is transmitted directly to the socket. The socket mates with one of the tubes as part of a respective gear engagement or disengagement operation. The operation of the tubes and socket is further described infra.

In general, gear set 508 includes two groups of gears, for example, gears 600-602 are the odd gears and are placed on the drive shaft consecutively and gears 603-605 are even gears, also placed consecutively with reverse gear 606. It should be understood that other numbers and combinations of gears can be used with assembly 500. Individual gears are separated as is known in the art, for example, by thrust bearings 608, to react axial thrust loads generated by gear set 508.

The following describes the operation of assembly 500 in further detail. Functionally, assembly 500 can be divided into four operations—even gear select, even gear shift, odd gear select, and odd gear shift. The four operations are achieved by appropriate manipulation of the assembly as described infra.

For an even gear select operation, servo motor 514 turns clockwise turning input shaft 518 with it. Threads 574 mate with threads 568, moving gear shaft 560 and gear 516 axially toward gear 522. For ease of presentation, only a single lug 536 is referenced in the following description, however, it should be understood that multiple lugs 536 are within the spirit and scope of the claimed invention. Lug 536 is in position 610 in slot 539 of one way clutch member 525. Shaft 518 is prevented from turning relative to the drive shaft by the lugs riding in the slots. Socket 520 is rigidly attached to ring gear 516 and also moves towards surface 532. Socket members 612 engage slots 582 such that tube 501 and ring gear 516 are rotationally locked. Any rotational motion, or axial motion toward surface 532 experienced by ring gear 516 is transmitted to the tube.

The following describes a sequence of positioning and movement of lug 536 with respect to element 525. Path 614 shows the approximate movement of lug 536 from position 610 to select and engage an even gear. In position 610 in slot 538, an odd gear associated with this position is engaged. In some aspects, an even gear also is engaged, typically the previous gear in which the transmission was operating. In other words, assembly 500 is operating in an odd gear. At point 610, lug 536 is in contact with wall 616, although the exact location of point 610 can vary from that shown in FIG. 31.

To begin the even gear select process, motor 514 rotates shaft 518 clockwise, as described supra, causing lug 536 to translate axially and then rotationally through path segment 617 to reach position 618. The subsequent axial and rotational movement of the tube causes protrusions 502 to rotate away from pins 578 with which the protrusions were engaged. From position 618, the rotation of shaft 518 causes the lug to move axially through the slot since the slot opposes rotation of the lug. The lug translates axially through segment 620 until gear 516 contacts surface 532 and the lug reaches the ramp at position 622. During this translation, tube 501 also translate axially, but does not rotate. When the lug reaches the ramp, the force transmitted by shaft 518 causes the lug to rotate clockwise and ride up the ramp, which causes element 525 to axially slide in direction 626. The motor continues to rotate shaft 518 clockwise along surface 628 until the lug reaches point 630, which is known to be further clockwise than the desired position for lug 536 with respect to slot 539a (associated with the selected gear). As the lug clears surface 628, spring 530 pushes element 525 back in direction 632 until the element again rests against surface 532. From point 630, the motor 514 rotates shaft 518 counterclockwise and lug 536 subsequently moves counterclockwise to position 634. However, since element 525 has moved in direction 632, the counterclockwise movement causes the lug to engage side wall 636 of slot 539a (the return movement of element 525 causes the lug and wall 636 to be circumferentially aligned). Thus, the correct positioning of the lug for the selected gear is ensured.

The continued rotation of shaft 518 draws lug 536 axially through slot 539a and segment 638 until the lug reaches position 640. This axial movement causes protrusions 502 to circumferentially align with pins 578. From position 640, the lug is able to rotate through segment 642, causing tube 501 to rotate and protrusions 502 to contact and rotate pins 578 to engage the selected even gear and disengage the remaining even gears and the reverse gear. This rotational movement of tube 501 also causes lugs 592 to align with and engage with slots 596, rotationally locking the tube. Lug 536 comes to rest at position 646.

For an odd gear select operation, for example, beginning at position 646, servo motor 514 turns counterclockwise turning input shaft 518 with it. Threads 574 mate with threads 568, moving gear shaft 560 and gear 516 axially toward the servo motor. Socket members 650 engage slots 586 such that tube 503 and ring gear 516 are rotationally locked. Any rotational motion or axial motion toward surface 532 experienced by ring gear 516 is transmitted to the tube. Lug 536 displaces through slots 538 in the same manner as described for an even gear selection and engagement, except that the axial and rotational directions are reversed and ring gear 516 engages surface 534 when the lug begins to ride the ramp. Partial path 648 shows the beginning of the movement of lug 536 in an odd gear operation starting from position 646. At the end of the selection and engagement operation, lugs 594 align with and engage slots 598, rotationally locking tube 503.

Gear set 512 is a mechanism to control the rotary position of ring gear 516. Interface assembly 540 guides lugs 536 through appropriate slots 538 and 539, axially and rotationally displacing ring gear 516 with respect to axis 652 of the drive shaft. For the gear selection process, gear 516 is in one of two positions. For an even gear selection, gear 516 is pushed against surface 532 and able to rotate freely in one direction so that tube 501 selects the desired gear. For an odd gear selection, gear 516 is pushed against surface 534 and able to rotate freely in the opposite direction so that tube 503 selects the desired gear.

The slots in assembly 540 are configured such that ring gear 516, in particular, lugs 536, is guided to: be on end 654 and turn to select an even gear; be axially in a slots 539 and rotate to turn pin(s) 578 for an even gear engagement; be axially in middle 656 of assembly 540 and disengage from one of tube 501 and 503 to the other of the tubes; be axially in a slots 538 and rotate to turn pin(s) 578 for an odd gear engagement; or be on end 658 and turn to select an odd gear. Thus, assembly 500 engages a gear from the odd or even gear set and then pre-selects another gear from the other set.

Figure 32:
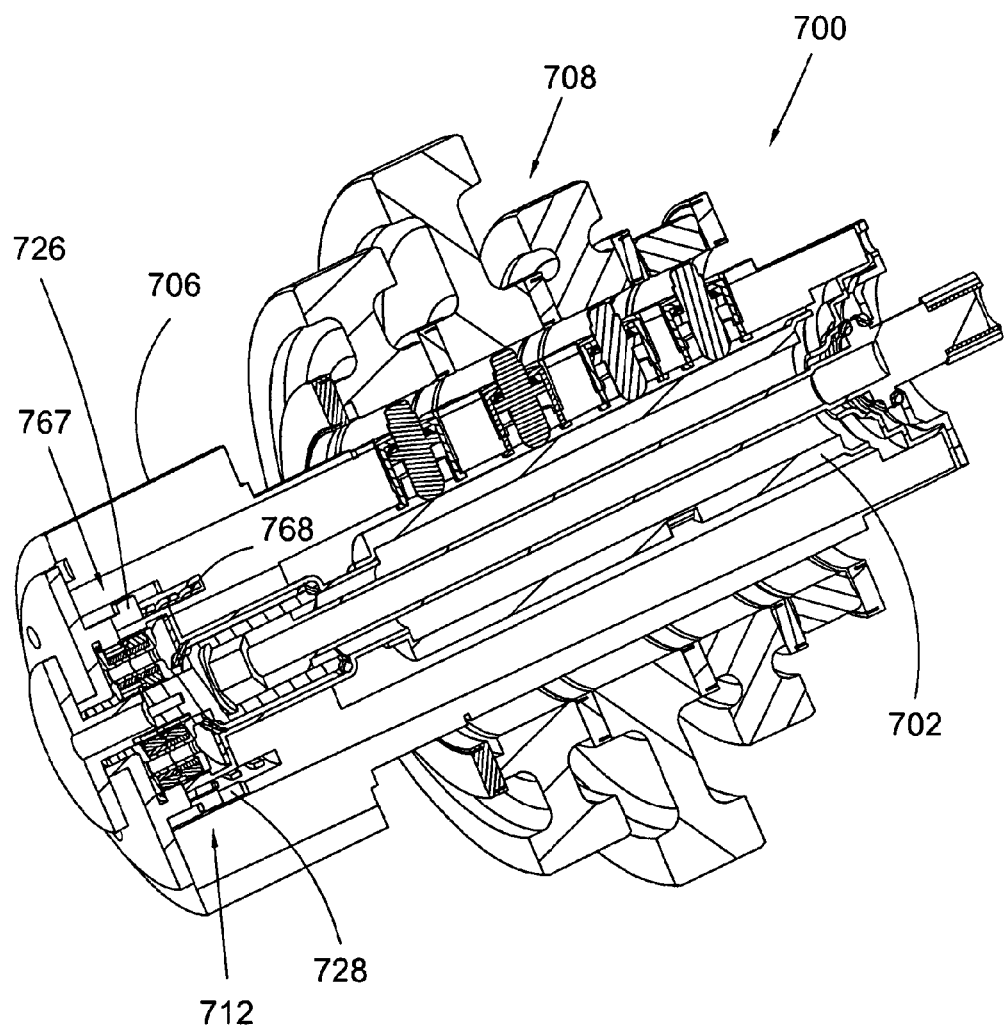
FIG. 32 is a cross-sectional view of a present invention gear selection assembly for a motorcycle.

FIG. 32 is a cross-sectional view of present invention gear selection assembly 700 for a motorcycle.

Figure 33:
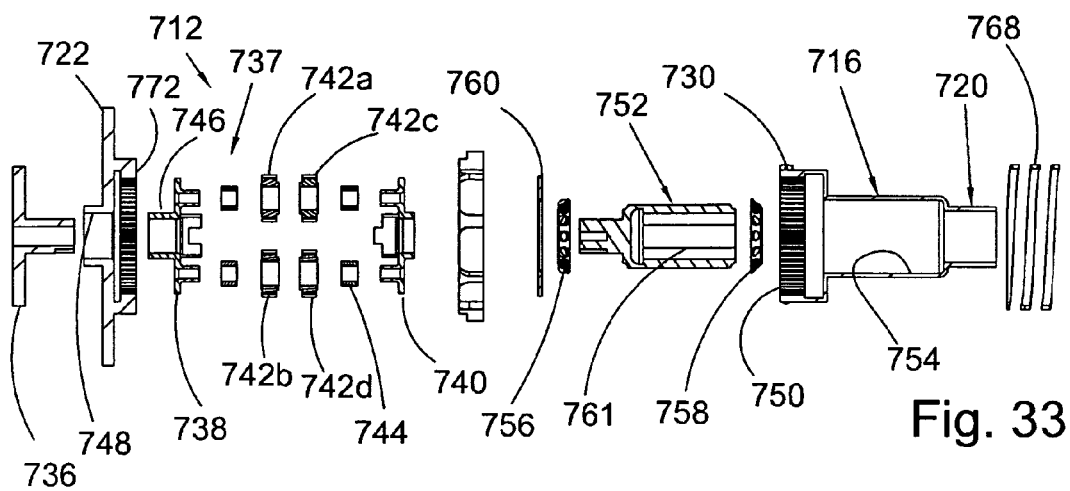
FIG. 33 is an exploded view of the differential rotation element in FIG. 32.

FIG. 33 is an exploded view of the differential rotation element in FIG. 32.

Figure 34:
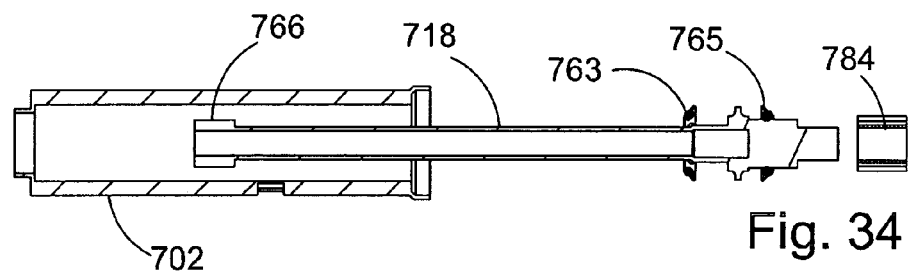
FIG. 34 is a cross-sectional view of the shaft for the displacing means in FIG. 32.

FIG. 34 is a cross-sectional view of the shaft for the displacing means in FIG. 32.

Figure 35:
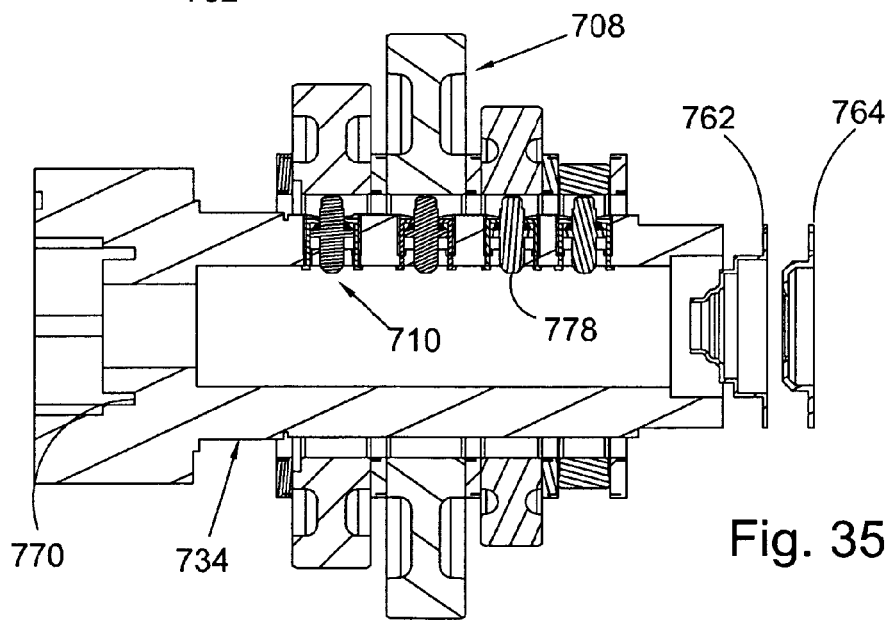
FIG. 35 is a cross-section view of the drive shaft in FIG. 32.

FIG. 35 is a cross-section view of the drive shaft in FIG. 32.

Figure 36:
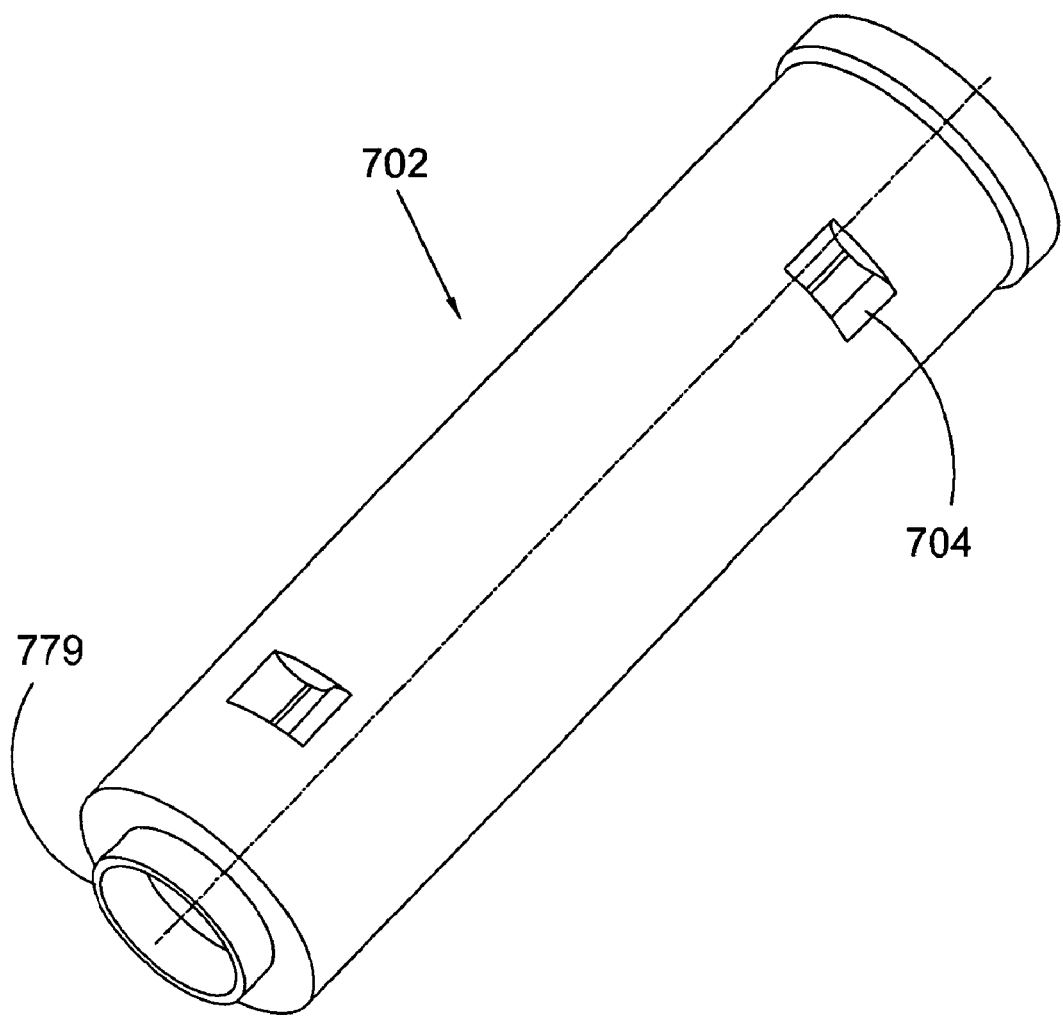
FIG. 36 is a perspective view of the tube in FIG. 32.

FIG. 36 is a perspective view of the tube in FIG. 32.

Figure 37:
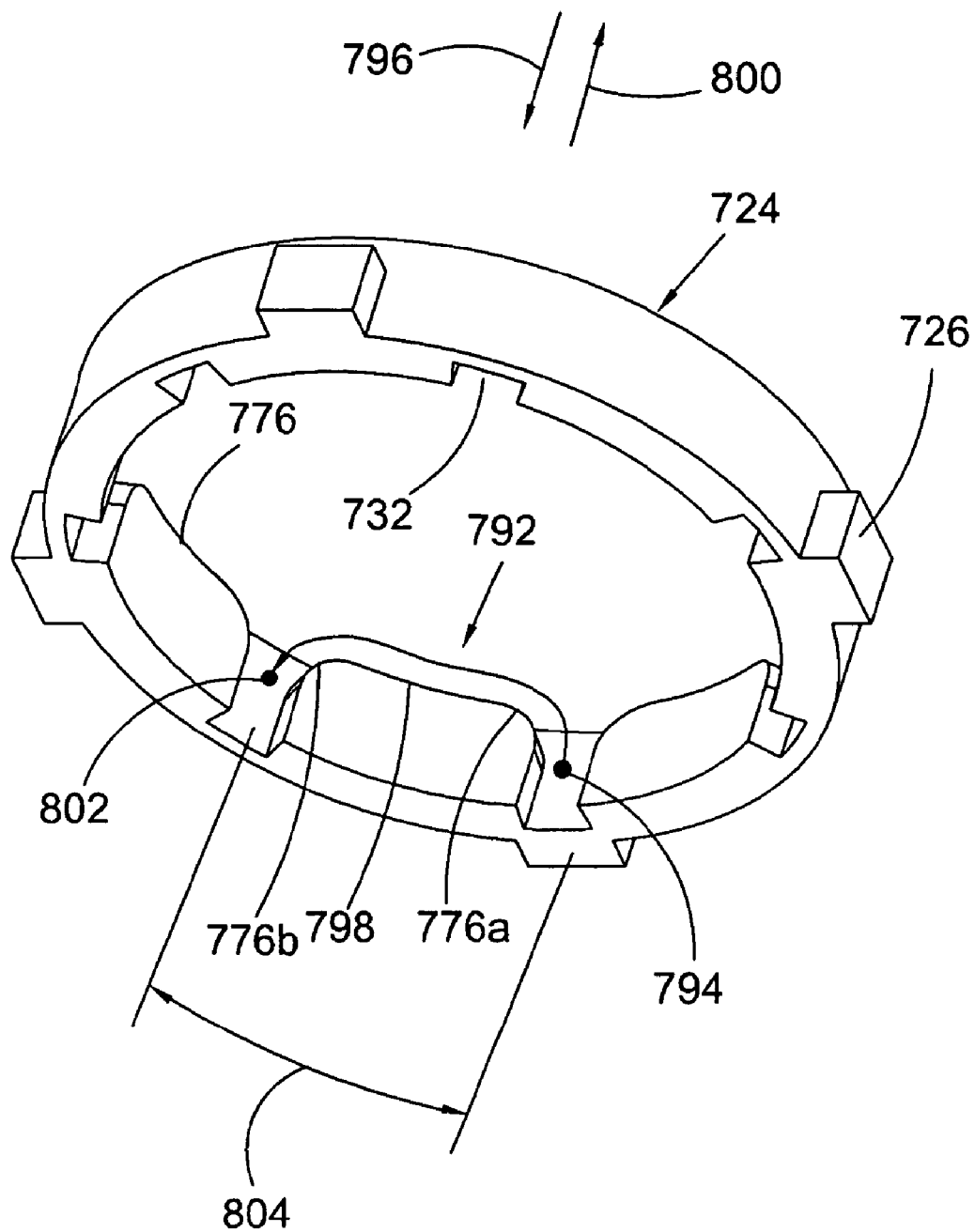
FIG. 37 is a perspective view of the interface element.

FIG. 37 is a perspective view of the interface element in FIG. 32.

Figure 38:
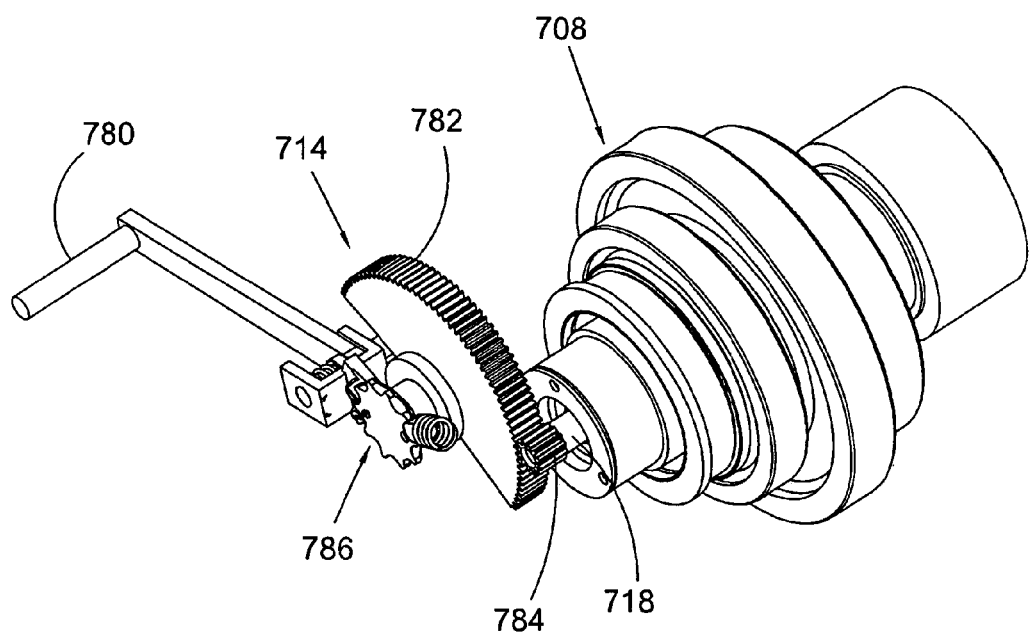
FIG. 38 is a perspective view of the gear selection assembly in FIG. 32 with a gear shift mechanism; and, FIG. 39 is a perspective view of the gear selection assembly in FIG. 32 with a gear shift mechanism.

FIG. 38 is a perspective view of the gear selection assembly in FIG. 32 with a gear shift mechanism.

Figure 39:
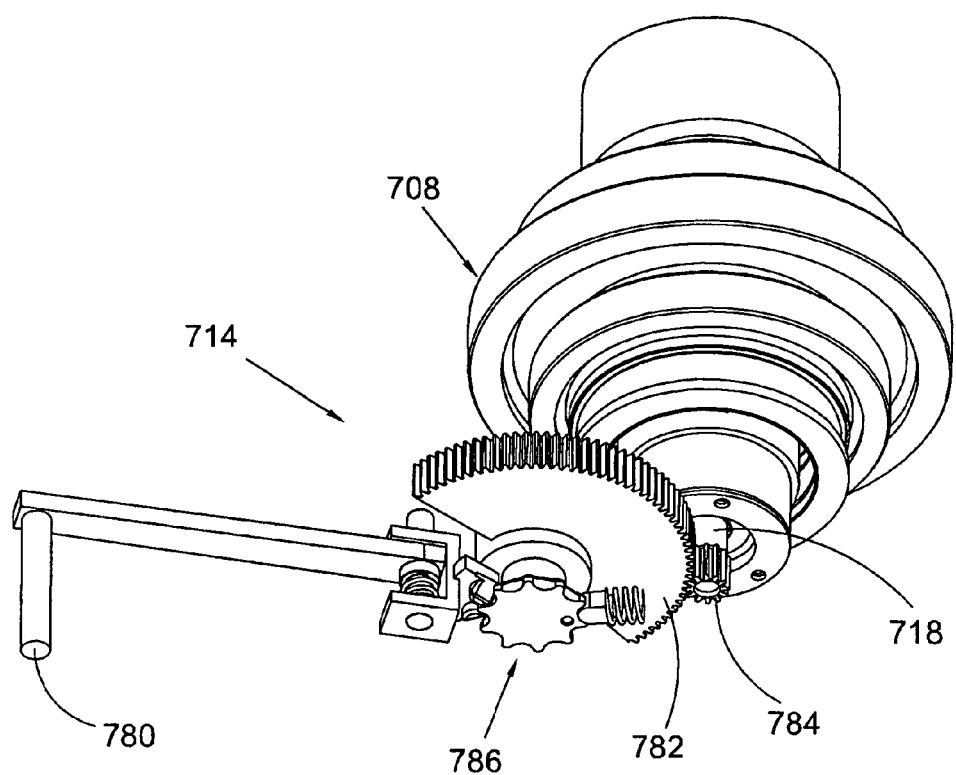

FIG. 39 is a perspective view of the gear selection assembly in FIG. 32 with a gear shift mechanism. The following should be viewed in light of FIGS. 32 through 39. Assembly 700 includes tube 702 with at least one engagement feature 704.

In some aspects, feature 704 is an indent. Tube 702 is arranged to be disposed in drive shaft 706 for a transmission (partially shown). The transmission includes at least one gear 708 and drive shaft 706 includes at least one gear actuation assembly 710. In the description that follows, at least one gear 708 is a plurality of gears, however, it should be understood that at least one gear 708 can be a single gear.

Assembly 700 includes differential rotation element 712 coupled with tube 702 and arranged to be coupled with the drive shaft so that tube 702 is differentially rotatable with respect to the drive shaft. Tube 702 is arranged to differentially rotate such that engagement features 704 engage gear actuation assemblies 710 and the transmission engages a respective gear from gears 708. Assembly 700 also includes a means 714 for displacing portion 716 of differential rotation element 712 such that tube 702 rotationally displaces with respect to the drive shaft. The means is attached to shaft 718, which is connected to portion 716 and arranged to transfer rotational motion from the means to portion 716. In some aspects, means 714 is a gear shift mechanism as shown in FIGS. 38 and 39.

In some aspects, element 712 is a gear set. In some aspects, the gear set is a planetary gear set, for example, as shown in FIG. 33. Then, ring gear 716 is the portion of element 712 displaced by the means 714. Gear 716 is fixedly secured to tube 702 at end 720 and ring gear 722 is arranged to be fixedly secured to the drive shaft.

Assembly 700 includes interface element 724 arranged to be disposed within the drive shaft and rotationally fixed to the drive shaft. Element 724 is axially displaceable with respect to the drive shaft due to the interface of lugs 726 on the element and matching grooves 728 in the drive shaft. Carrier 716 axially and rotationally engages with the interface element to controllably position tube 702, as further described infra.

Carrier 716 includes at least one protrusion 730 and interface element 724 includes at least one slot 732. The protrusion is axially and rotationally displaceable through slots 732 as described infra.

The following is a more detailed description of the components of assembly 700. Assembly 700 includes planetary gear assembly 712; interface assembly, or detent, 733, which includes interface element 724; and tube 702, arranged to engage or connect to gear actuation assembly 710. When used with mechanism 714, these components sequentially select and engaged gears from gear set 708. In some aspects, the actual engagement element is a slipper clutch (not shown) located in the cylindrical space between the outer diameter 734 of the drive shaft and the inner diameter of individual gears 708.

Planetary gear assembly 712 includes sun gear 736 fixed to the gear box housing (not shown). Planet carrier assembly 737 includes carriers 738 and 740 that carry four (4) rotatable planet gears 742a, 742b, 742c, 742d, each with a pressed in bronze bushings 744. The planet carrier assembly is positioned axially such planet gears 742a and 742b mate with the ring gear 722. Pilot 746 mates with internal pilot 748 for accurate radial position of ring gear 738.

Planet gears 742c and 742d mate with ring gear 716. Sun gear shaft 752 mates with planet gears 742c and 742d. Sun gear shaft 752 mates with planet gears 742c and 742d. Sun shaft 752 is rotatable, axially fixed, and radially centered in inside bore 754 of gear 716 using any means known in the art, for example, ball bearings 756 and 758. Plate 760 is fixed to gear 716 and axially fixes sun gear shaft 752 with gear 716. Sun gear shaft 752 has an internal hex shape 761. The gear on shaft 752 is similar to gear on sun gear 736 but longer in length. It should be understood that a present invention planetary gear assembly is not limited to the size, number, and configuration of components described supra.

Input shaft 718 is rotationally connected to servo motor 714 using any means known in the art. In some aspects, a bearing pack including element 762-765 supports shaft 718 drive shaft and axially fixes shaft 718. Shaft 718 has hex shaped end 766 which mates with internal hex shape 761. Members 762 and 763 are fixed rigidly to the drive shaft.

Interface assembly 767 includes interface element 724 and compression element 768. Element 768 can be any compression element known in the art, for example, a spring. Element 724 is fixed axially by element 768 and is fixed rotationally by clutch element lugs 726 and grooves 728. Spring 768 reacts against surface 770 of the drive shaft to keep clutch member 724 firmly pressed against surface 772 of ring gear 722.

At least one lug 730 on the periphery of gear 716 rides inside a respective matching groove, or slot, 732 in one way clutch element 724, facilitating motion of member 716. Element 724 provides a detent force when a gear from gear set 708 is engaged and lugs 730 are disposed in slots 732 when the gear is engaged. Each of grooves 732 ends in respective ramps 776. The ramps enable a smooth rotational motion of gear 716. The ramps are used for transitioning from gear shift to gear select and from gear select to gear shift as described infra.

Individual engagement features, or cam lobes, in the form of depressions or indents, 704 on the surface of tube 702 function to either engage a particular gear 708 by letting spring loaded activation pin 778 lower itself into a lobe or disengage a particular lobe by rotating tube 702 to move the respective indent out of rotation with the pin, as further described below. Assembly 700 and indents 704 keep gear set 708 disengaged by default and engage a gear only when a lobe is presented directly below an actuation pin. This arrangement makes assembly 700 intrinsically safe by interlocking all gears except the gear being engaged. Only one gear is engaged at any one time. Tube 702 is rigidly attached to end 720 of ring gear 716 by mating end 779.

FIG. 32 shows four gears in gear set 308, however, it should be understood that assembly 700 is not limited to this number of gears and that other numbers of gears are included in the spirit and scope of the claimed invention. The gear select operation is sequential during an up shift or a down shift. Thus, to select the $3^{rd}$ gear, the transmission must initially be in $2^{nd}$ gear for an up shift or $4^{th}$ gear for a down shift. The exception is the neutral which in some aspects, falls between $1^{st}$ and $2^{nd}$ gear.

Mechanism 714 can be any gear shift mechanism known in the art. In general, mechanism 714 operates to convert force against lever 780, for example, force applied by the foot of an operator (not shown) riding a motorcycle (not shown) into which assembly 700 has been installed, into rotation of gear 782, which is engaged with gear 784. Gear 784 is rotationally fixed to shaft 718. Thus force against lever 780 results in rotation of shaft 718. Ratchet mechanism 786 controls the motion from lever 780 and transfers that motion into discrete, controlled partial revolutions of gear 782.

The following describes the operation of assembly 700 in further detail. Functionally, assembly 700 can be divided into two operations—gear select and gear shift. The two operations are achieved by appropriate manipulation of the assembly as described infra.

To initiate a gear select operation, gear 784 is turned resulting in a rotation of shaft 718 by an angle associated with the next gear in the sequence of gears 708. Hex 766 mates with hex shape 761, rotating ring gear 716.

The following describes a sequence of positioning and movement of lug 730 with respect to element 724. Path 792 shows the approximate movement of lug 730 from an engaged position for assembly 700 though the gear selection process to the engagement of another gear in group 708. In the engaged position, lug 730 is approximately located at point 794 in slot 732a. It should be understood that the exact location of point 794 can vary from that shown in FIG. 37.

To begin the select process, mechanism 714 rotates shaft 718 clockwise or counterclockwise. For this illustration, we assume that lever 780 has been depressed, causing a counterclockwise rotation of shaft 718. At position 794, the lug is just engaging ramp 776a and the rotational force from shaft 718 causes the lug to begin riding up the ramp and forcing element 724 in direction 796. The lug continues to rotate, while engaging surface 798 until the lug reaches an edge of ramp 776b. As the lug rotates further, the lug rides down ramp 776b as the spring moves element 724 in direction 800. As the lug reaches the other edge of ramp 776b in position 802, element 724 once again is pushed against surface 770 by spring 768. The rotation from position 794 causes the disengagement of the gear that was engaged in position 794 and the rotation into position 802 causes the selection and engagement of the next desired gear. It should be understood that although path 792 appears to have an axial component, in actuality, path 792 is only rotational and that the axial movement of element 724 enables this rotational only movement. The angle 804 of rotation for lug 730 is correlated to the rotation imparted by each operation of ratchet mechanism 786.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What we claim is:

1. A gear selector assembly, comprising:
   a first tube with at least one first engagement feature, said first tube arranged to be disposed within a drive shaft for a transmission, said transmission including at least one gear and said drive shaft including at least one gear actuation assembly; and
   a differential rotation element coupled with said first tube and arranged to be coupled with said drive shaft so that said first tube is differentially rotatable with respect to said drive shaft,
   a means for displacing a portion of said differential rotation element such that said first tube axially and rotationally displaces with respect to said drive shaft; and
   an interface element arranged to be disposed within said drive shaft and rotationally fixed to said drive shaft,
   wherein said portion of said differential rotation element axially and rotationally engages with said interface element to controllably position said first tube, and
   wherein said first tube is arranged to differentially rotate such that said at least one first engagement feature engages said at least one gear actuation assembly and said transmission engages a respective gear from said at least one gear.

2. The assembly of claim 1, wherein controllably positioning said first tube comprises rotating said first tube.

3. The assembly of claim 1, wherein controllably positioning said first tube comprises axially displacing said first tube.

4. The assembly of claim 1, wherein said differential rotation element comprises a gear set.

5. The assembly of claim 4, wherein said gear set comprises a planetary gear set.

6. The assembly of claim 5, wherein said planetary gear set comprises a first ring carrier fixedly secured to said first tube and a second ring carrier arranged to be fixedly secured to said drive shaft and wherein said portion of said differential rotation element comprises said first ring carrier.

7. The assembly of claim 6, wherein said first ring carrier comprises at least one protrusion, said interface element includes at least one slot, and said at least one protrusion is axially and rotationally displaceable through said at least one slot.

8. The assembly of claim 1, wherein said means for displacing a portion of said differential rotation element further comprises a shaft connected to said portion of said differential rotation element and arranged to transfer rotational motion to said portion of said differential rotation element.

9. The assembly of claim 8, wherein said means for displacing a portion of said differential rotation element further comprises an actuator, said shaft is connected to said actuator, and said actuator is arranged to rotate said shaft.

10. The assembly of claim 9, wherein said actuator is selected from the group consisting of an electric motor and a hydraulic actuator.

11. The assembly of claim 1, wherein said at least one first engagement feature comprises a plurality of first engagement features, said at least one respective gear actuation assembly comprises a plurality of gear actuation assemblies, and said plurality of first engagement features is disposed such that no more than one gear actuation assembly from said plurality of gear actuation assemblies engages said plurality of first engagement features at any one time.

12. The assembly of claim 1, wherein said at least one first engagement feature comprises an indent in an outer surface of said first tube, said at least one respective gear actuation assembly comprises a pin urged against said first tube, and said first tube is alignable to engage said pin with said indent so that said transmission engages a respective gear from said at least one gear.

13. The assembly of claim 1, wherein said at least one first engagement feature comprises an indent in an outer surface of said first tube, said at least one respective gear actuation assembly comprises a pin engaged with said indent, and said first tube is displaceable to disengage said pin and said indent such that said transmission disengages a respective gear from said at least one gear.

14. The assembly of claim 1 wherein said first tube is controllably connected to said differential rotation element, said at least one gear comprises first and second groups of gears, and said first tube is associated with said first group; and said assembly further comprising a second tube with at least one second engagement feature, said second tube arranged to be disposed within said drive shaft, said second tube controllably coupled with said differential rotation element and arranged to be coupled with said drive shaft so that said second tube is differentially rotatable with respect to said drive shaft, wherein said second tube is arranged to differentially rotate such that said at least one second engagement feature engages said at least one gear actuation assembly and said transmission engages a respective gear from said second group of gears.

15. The assembly of claim 14, wherein said means for displacing a portion of said differential rotation element axially and rotationally displaces said second tube with respect to said drive shaft and said portion of said differential rotation element axially and rotationally engages with said interface element to controllably position said second tube.

16. A gear selector assembly comprising:
a first tube with at least one first engagement feature, said first tube arranged to be disposed within a drive shaft for a transmission, said transmission including at least one first and second gear and said drive shaft including a plurality of gear actuation assemblies; a second tube with at least one second engagement feature, said second tube arranged to be disposed within said drive shaft; and,
a differential rotation element controllably coupled with said first and second tubes and arranged to be coupled with said drive shaft so that said first and second tubes are differentially rotatable with respect to said drive shaft,
wherein said first and second tubes are arranged to differentially rotate such that said at least one first and second engagement features engage said at least one gear actuation assembly and said transmission engages respective gears from said at least one first and second gear.

17. The assembly of claim 16, further comprising a means for displacing a portion of said differential rotation element such that said first and second tubes axially and rotationally displace with respect to said drive shaft.

18. The assembly of claim 17, further comprising an interface element arranged to be disposed within said drive shaft and rotationally fixed to said drive shaft, wherein said portion of said differential rotation element axially and rotationally engages with said interface element to controllably position said first and second tubes.

19. The assembly of claim 18, wherein said at least one first and second gear set comprises a planetary gear set with a first ring carrier controllably connectable to said first and second tubes and a second ring carrier arranged to be fixedly secured to said drive shaft and wherein said portion of said differential rotation element comprises said first ring carrier.

20. The assembly of claim 19, wherein said first ring carrier comprises at least one protrusion, said interface element includes at least one slot, and said at least one protrusion is axially and rotationally displaceable through said at least one slot.

21. The assembly of claim 17, wherein said means for displacing a portion of said differential rotation element further comprises a shaft connected to an actuator and said portion of said differential rotation element, said shaft arranged to transfer rotational motion from said actuator to said portion of said differential rotation element to displace said portion of said differential rotation element.

22. The assembly of claim 17, wherein said at least one first and second engagement features comprise a plurality of first and second engagement features, respectively, said at least one respective gear actuation assembly comprises a plurality of gear actuation assemblies for a first group and a plurality of gear actuation assemblies for a second group, and said pluralities of first and second engagement features are disposed such that no more than one gear actuation assembly each from said pluralities of gear actuation assemblies for said first and second groups engages said pluralities of first and second engagement features, respectively, at any one time.

23. The assembly of claim 17, wherein said at least one first and second engagement features comprise a plurality of first and second engagement features, respectively, said at least one respective gear actuation assembly comprises respective pluralities of gear actuation assemblies for saw first and second groups, and said pluralities of first and second engagement features are disposed such that no more than one gear actuation assembly each from said respective pluralities of gear actuation assemblies for said first and second groups are engageable with said pluralities of first and second engagement features, respectively, at any one time.

24. The assembly of claim 17, wherein said at least one first and second engagement features comprise a plurality of first and second engagement features, respectively, said at least one respective gear actuation assembly comprises respective pluralities of gear actuation assemblies for first and second groups, and said pluralities of first and second engagement features are disposed such that one gear actuation assembly each from said respective pluralities of gear actuation assemblies for said first and second groups are simultaneously engageable with said pluralities of first and second engagement features, respectively.

25. A gear selector assembly comprising: a tube with at least one engagement feature, said tube arranged to be disposed within a drive shaft for a transmission, said transmission including at least one gear and said drive shaft including at least one gear actuation assembly; a planetary gear set with a first ring carrier fixedly secured to said tube and a second ring carrier arranged to be fixedly secured to said drive shaft so that said tube is differentially rotatable with respect to said drive shaft, said first ring carrier comprising a protrusion; a means for axially and rotationally displacing said first ring carrier; and, an interface element arranged to be disposed within said drive shaft and rotationally fixed to said drive shaft, said interface element comprising at least one slot, wherein said first ring carrier axially and rotationally displaces through said at least one slot to controllably position said tube such that said at least one first engagement feature engages said at least one gear actuation assembly and said transmission engages a respective gear from said at least one gear.

26. A gear selector assembly comprising:
a tube with at least one engagement feature, said tube arranged to be disposed within a drive shaft for a transmission, said transmission including at least one gear; at least one gear actuation assembly arranged to be disposed on said drive shaft;
a differential rotation element coupled with said tube and arranged to be coupled with said drive shaft so that said tube is differentially rotatable with respect to said drive shaft,
a means for displacing a portion of said differential rotation element such that said tube axially and rotationally displaces with respect to said drive shaft; and
an interface element arranged to be disposed within said drive shaft and rotationally fixed to said drive shaft,
wherein said portion of said differential rotation element axially and rotationally engages with said interface element to controllably position said first tube and
wherein said differential rotatability is arranged to cause said at least one engagement feature to engage said at least one gear actuation assembly such that said transmission engages a respective gear from said at least one gear.

* * * * *